United States Patent
Chae

(10) Patent No.: US 11,899,722 B2
(45) Date of Patent: Feb. 13, 2024

(54) SEARCH SYSTEM, SEARCH METHOD, AND PROGRAM

(71) Applicant: RAKUTEN GROUP, INC., Tokyo (JP)

(72) Inventor: Yeongnam Chae, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 640 days.

(21) Appl. No.: 16/971,292

(22) PCT Filed: Jun. 20, 2018

(86) PCT No.: PCT/JP2018/023458
§ 371 (c)(1),
(2) Date: Aug. 19, 2020

(87) PCT Pub. No.: WO2019/244277
PCT Pub. Date: Dec. 26, 2019

(65) Prior Publication Data
US 2020/0394447 A1    Dec. 17, 2020

(51) Int. Cl.
*G06V 10/82*    (2022.01)
*G06F 16/903*    (2019.01)
(Continued)

(52) U.S. Cl.
CPC ........ *G06F 16/90335* (2019.01); *G06F 16/53* (2019.01); *G06F 16/55* (2019.01);
(Continued)

(58) Field of Classification Search
CPC .......... G06F 16/53; G06F 16/55; G06F 18/22; G06N 3/042; G06N 3/08; G06V 10/82
(Continued)

(56) References Cited

U.S. PATENT DOCUMENTS

2011/0085739 A1    4/2011    Zhang et al.
2015/0161178 A1    6/2015    Badoiu
(Continued)

FOREIGN PATENT DOCUMENTS

| EP | 3300002 A1 | 3/2018 |
| JP | 2003256427 A | 9/2003 |
| WO | 2011070832 A1 | 6/2011 |

OTHER PUBLICATIONS

Li, Hailiang, Yongqian Huang, and Zhijun Zhang. "An improved faster R-CNN for same object retrieval." IEEE Access 5 (2017): 13665-13676. (Year: 2017).*

(Continued)

*Primary Examiner* — Sean M Conner
(74) *Attorney, Agent, or Firm* — HEA LAW PLLC

(57) ABSTRACT

To improve accuracy of search, a learner (L) of a search system calculates a feature quantity of information that is input and outputs a first analysis result of the information in a first viewpoint and a second analysis result of the information in a second viewpoint based on the feature quantity. Storing means stores a feature quantity of information to be searched, which has been input in the learner (L), in a database. Input means inputs input information in the learner (L). Search means searches for information to be searched that is similar to the input information in the feature quantity based on the database.

17 Claims, 12 Drawing Sheets

(51) Int. Cl.
| | |
|---|---|
| G06T 7/70 | (2017.01) |
| G06F 16/55 | (2019.01) |
| G06F 16/53 | (2019.01) |
| G06N 3/08 | (2023.01) |
| G06F 18/22 | (2023.01) |
| G06F 18/211 | (2023.01) |
| G06F 18/2413 | (2023.01) |
| G06N 3/042 | (2023.01) |
| G06V 10/74 | (2022.01) |
| G06V 10/764 | (2022.01) |

(52) U.S. Cl.
CPC ............ *G06F 18/211* (2023.01); *G06F 18/22* (2023.01); *G06F 18/2413* (2023.01); *G06N 3/042* (2023.01); *G06N 3/08* (2013.01); *G06T 7/70* (2017.01); *G06V 10/761* (2022.01); *G06V 10/764* (2022.01); *G06V 10/82* (2022.01)

(58) Field of Classification Search
USPC ................. 382/155–160, 165, 170, 224–227
See application file for complete search history.

(56) References Cited

U.S. PATENT DOCUMENTS

| | | | | |
|---|---|---|---|---|
| 2017/0262552 | A1* | 9/2017 | Noma | G06F 16/90335 |
| 2017/0304732 | A1 | 10/2017 | Velic et al. | |
| 2018/0018524 | A1* | 1/2018 | Yao | G06V 20/56 |
| 2018/0060684 | A1* | 3/2018 | Ma | G06V 20/52 |
| 2019/0354689 | A1* | 11/2019 | Li | G06N 3/04 |
| 2022/0139063 | A1* | 5/2022 | Singh | G06V 10/776 382/103 |

OTHER PUBLICATIONS

Lin, Kevin, et al. "Deep learning of binary hash codes for fast image retrieval." Proceedings of the IEEE conference on computer vision and pattern recognition workshops. 2015. (Year: 2015).*

Ren, Shaoqing, et al. "Faster r-cnn: Towards real-time object detection with region proposal networks." Advances in neural information processing systems 28 (2015). (Year: 2015).*

Search Report dated "Dec. 1, 2021", for related EP Patent Application No. 18923260.6, pp. 1-10.

International Search Report for PCT/JP2018/023458 with English translation.

Office Action dated Apr. 7, 2020, for relating JP application No. 2019-233307 with partial English translation.

http://papers.nips.cc/paper/5638-faster-r-cnn-towards-real-time-object-detection-with-region-proposal-networks (Abstract of Part of: Advances in Neural Information Processing Systems 28 (NIPS 2015)(/book/advances-in-neural-information-processing-systems-28-2015)).

https://www.cvfoundation.org/openaccess/content_cvpr_workshops_2015/W03/papers/Lin_Deep_Learning_of_2015_CVPR_paper.pdf (Abstract of Kevin Lin, Huei-Fang Yang, Jen-Hao Hsiao, Chu-Song Chen; The IEEE Conference on Computer Vision and Pattern Recognition (CVPR) Workshops, 2015, pp. 27-35).

Office Action dated Dec. 15, 2022, for corresponding EP Patent Application No. 18923590.6, pp. 1-6.

Artem Babenko et. al. "Neural Codes for Image Retrieval" In: "SAT 2015 18th International Conference, Austin TX, USA, Sep. 24-27, 2015", Jan. 1, 2014, Springer, Berlin, Heidelberg 032548, XP055281547, ISBN: 3540745491 vol. 8689, pp. 584-599, DOI: 10.1007/978-3-319-10590-1_38.

Amaia Salvador et. al. "Faster R-CNN Features for Instance Search", 2016 IEEE Conference on Computer Vision and Pattern Recognition Workshops (CVPRW), IEEE, Jun. 26, 2016, pp. 394-401, XP033027852, DOI: 10.1109/CVPRW.2016.56.

Fergus R. et. al. "Object class recognition by unsupervised scale-invariant learning", Proceedings/ 2003 IEEE Computer Society Conference on Computer Vision and Pattern Recognition, Jun. 18-20, 2003, Madison, Wisconsin; [Proceeding of the IEEE Computer Conference on Computer Vision and Pattern Recognition], Los Alamitos, Calif. [U. A. vol.2, Jun. 18, 2003, pp. 264-271, XP010644682, DOI: 10.1109/CVPR.2003. 1211479,ISBN:978-0-7695-1900-5.

Office Action dated Sep. 29, 2023, for related EP Patent Application No. 18923260.6, pp. 1-11.

* cited by examiner

FIG.5

| FILE NAME | FEATURE VECTOR | BOX INFORMATION | SCORE |
|---|---|---|---|
| a00001.jpg | (0.3,0.1,0.2···) | (100,100,50,70) | [0.8,0.2,0.3···] |
| a00002.jpg | (0.4,0.05,0.15···) | (90,80,60,80) | [0.5,0.7,0.2···] |
| a00003.jpg | (0.7,0.2,0.3···) | (30,40,120,45) | [0.55,0.1,0.4···] |
| a00004.jpg | (0.25,0.22,0.7···) | (50,70,80,60) | [0.6,0.2,0.6···] |
| ··· | ··· | ··· | ··· |

DB

SEARCH SYSTEM, SEARCH METHOD, AND PROGRAM

CROSS REFERENCE TO RELATED APPLICATIONS

This application is a National Stage of International Application No. PCT/JP2018/023458 filed on Jun. 20, 2018. The contents of the above document is incorporated herein by reference in its entirety.

TECHNICAL FIELD

The present invention relates to a search system, a search method, and a program.

BACKGROUND ART

There is known a learner that calculates a feature quantity of input information, and based on the feature quantity, outputs a first analysis result of the information in a first viewpoint and a second analysis result of the information in a second viewpoint. Patent Literature 1 describes a learner that calculates a feature quantity of an input image (an example of information), and based on the feature quantity, outputs a classification result (an example of first analysis result) of an object in the image and a shape of a box surrounding the object (an example of second analysis result).

CITATION LIST

Non-Patent Document 1:
http://papers.nips.cc/paper/5638-faster-r-cnn-towards-real-time-object-detection-with-region-proposal-networks

SUMMARY OF INVENTION

Technical Problem

By using the learner as described above for searching similar information, it is being considered to search information to be searched that is similar to input information among information to be searched input in the learner. For example, by using the techniques in Patent Literature 1 for searching a similar image, it is being considered to search for an image to be searched similar to the input image in the classification of the object and the shape of the box among the images to be searched that have been input in the learner. However, the analysis result output from the learner is an analysis result of known features learned in the learner, and it is not possible to search for information that is similar in unknown features. As such, accuracy of the search cannot be fully improved.

One or more embodiments of the present invention have been conceived in view of the above, and an object thereof is to provide a search system, a search method, and a program capable of improving accuracy of search.

Solution to Problem

In response to the above described issues, a search system according to the present invention includes a learner that calculates a feature quantity of information that is input and outputs a first analysis result of the information in a first viewpoint and a second analysis result of the information in a second viewpoint based on the feature quantity, storing means for storing a feature quantity of information to be searched, which has been input in the learner, in a database, input means for inputting input information in the learner, and search means for searching for information to be searched that is similar to the input information in the feature quantity based on the database.

A search method according to the present invention includes a storing step of storing a feature quantity of information to be searched, which has been input in a learner, in a database, the learner calculating a feature quantity of information that is input and outputting a first analysis result of the information in a first viewpoint and a second analysis result of the information in a second viewpoint based on the feature quantity, an input step of inputting input information in the learner, and a search step of searching for information to be searched that is similar to the input information in the feature quantity based on the database.

A program according to the present invention for causing a computer to function as storing means for storing a feature quantity of information to be searched, which has been input in a learner, in a database, the learner calculating a feature quantity of information that is input and outputting a first analysis result of the information in a first viewpoint and a second analysis result of the information in a second viewpoint based on the feature quantity, input means for inputting input information in the learner, and search means for searching for information to be searched that is similar to the input information in the feature quantity based on the database.

In one aspect of the present invention, the learner includes an intermediate layer, a first output layer, and a second output layer, the intermediate layer is disposed before the learner branches into the first output layer and the second output layer and calculates the feature quantity, the first output layer outputs the first analysis result based on the feature quantity calculated by the intermediate layer before branching, and the second output layer outputs the second analysis result based on the feature quantity calculated by the intermediate layer before branching.

In one aspect of the present invention, the search means searches for information to be searched that is similar to the input information in the first analysis result, and, among the retrieved information to be searched, searches for information to be searched that is similar to the input information in the feature quantity.

In one aspect of the present invention, the search means searches for information to be searched that is similar to the input information in the second analysis result among the information to be searched that is similar to the input information in the first analysis result, and, among the retrieved information to be searched, searches for information to be searched that is similar to the input information in the feature quantity.

In one aspect of the present invention, the first analysis result is a classification result of the information that is input, the storing means stores the feature quantity of the information to be searched in a database corresponding to a classification of the information to be searched, each database being prepared for a corresponding classification, and the search means searches for information to be searched that is similar to the input information in the feature quantity based on the database corresponding to the classification result of the input information among the databases prepared for respective classifications.

In one aspect of the present invention, the learner calculates a feature vector as the feature quantity, and the search means performs the search based on a distance between a feature vector of information to be searched stored in the database and a feature vector of the input information.

In one aspect of the present invention, the storing means stores the information to be searched, which is output from the learner, in a database corresponding to a classification result of the information to be searched.

In one aspect of the present invention, the learner outputs a probability of each classification as the classification result, and the storing means stores the information to be searched, which is output from the learner, in a database of a classification having a probability of the information to be searched, the probability being equal to or more than a threshold value.

In one aspect of the present invention, the learner outputs a probability of each classification as the classification result, and the search means performs search based on a database of a classification having a probability of the input information, which is output from the learner, the probability being equal to or more than a threshold value.

In one aspect of the present invention, in a case where there are a plurality of databases that correspond to the classification result of the input information, based on each of the plurality of databases, the search means searches for candidates of information to be searched that is similar to the input information in the feature quantity, and narrows down the candidates.

In one aspect of the present invention, the search system further includes similarity obtaining means for obtaining a similarity based on the feature quantity of the input information and a feature quantity of information to be searched that is retrieved by the search means, and display control means for displaying the similarity in association with the information to be searched that is retrieved by the search means.

In one aspect of the present invention, the learner calculates a feature quantity of an image that is input and outputs a first analysis result in which a feature of the image is analyzed in the first viewpoint and a second analysis result in which a feature of the image is analyzed in the second viewpoint. The information to be searched is an image to be searched. The input information is an input image, and the search means searches for an image to be searched that is similar to the input image in the feature quantity.

In one aspect of the present invention, the learner calculates a feature quantity of an area indicating an object included in the input image and outputs the first analysis result and the second analysis result of the area, and, in a case where a plurality of areas overlapping with one another are included in the input image, based on a feature quantity of an area having a highest probability of at least one of the first analysis result or the second analysis result, the learner outputs the first analysis result and the second analysis result of the area.

In one aspect of the present invention, the storing means stores, in a database, the feature quantity of the area indicating the object included in the image to be searched, and in a case where a plurality of areas overlapping with one another are included in the image to be searched, the storing means stores a feature quantity of an area having a highest probability of at least one of the first analysis result or the second analysis result.

In one aspect of the present invention, the learner outputs a classification result of an object included in an image that is input as the first analysis result, and outputs position information about a position of the object as the second analysis result, and the search system further includes display control means for displaying the position information of the image to be searched retrieved by the search means in association with the image to be searched.

In one aspect of the present invention, the learner outputs a classification result of an object included in an image that is input as the first analysis result, and outputs position information about a position of the object as the second analysis result, and the search system further includes display control means for displaying the position information of the input image in association with the input image.

In one aspect of the present invention, in a case where an image that is input includes a plurality of objects, the learner calculates a feature quantity of each object and outputs the first analysis result and the second analysis result, the input image and the image to be searched each include a plurality of objects, and the search means searches for an image to be searched that is similar to the input image in the feature quantity of some of objects of the image to be searched.

Effects of the Invention

According to one or more embodiments of the present invention, it is possible to increase accuracy of search.

BRIEF DESCRIPTION OF THE DRAWINGS

FIG. 5 is a diagram illustrating an example of data storage of a database;

DESCRIPTION OF EMBODIMENTS

1. Embodiment 1

An embodiment of the search system according to the present invention will be described below.

[1-1. Overall Configuration of Search System]

Figure 1:
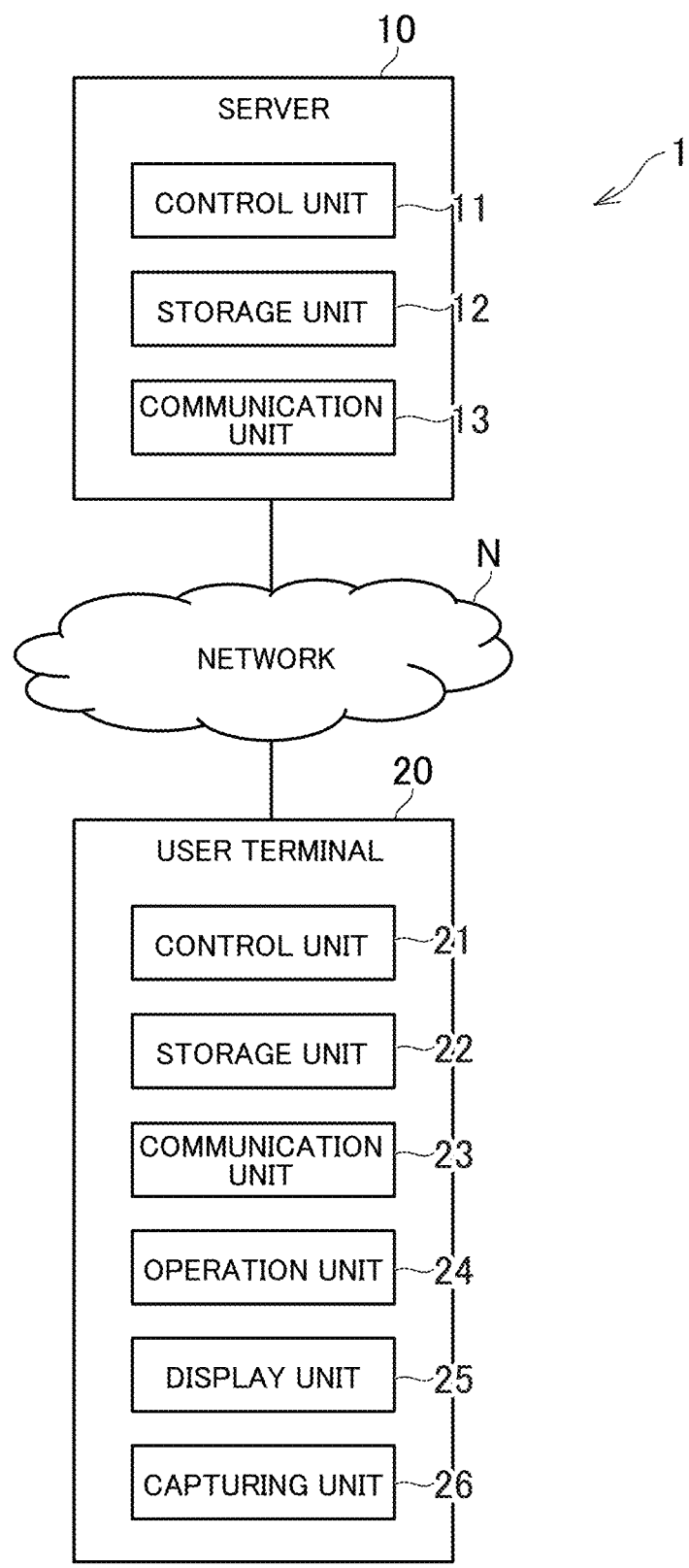
FIG. 1 is a diagram illustrating an overall configuration of a search system.

FIG. 1 is a diagram illustrating an overall configuration of the search system. As shown in FIG. 1, the search system 1 includes a server 10 and a user terminal 20. The server 10 and the user terminal 20 are connectable to a network, such as the Internet. FIG. 1 shows one server 10 and one user terminal 20, although the number of each of them may be two or more.

The server 10 is a server computer. The server 10 includes a control unit 11, a storage unit 12, and a communication unit 13. The control unit 11 includes, for example, at least one microprocessor. The control unit 11 executes processing in accordance with programs and data stored in the storage unit 12. The storage unit 12 includes a main storage unit and an auxiliary storage unit. For example, the main storage unit is a volatile memory such as a RAM, and the auxiliary storage unit is a nonvolatile memory such as a hard disk and a flash memory. The communication unit 13 is a wired or wireless communication interface for data communications through a network.

The user terminal 20 is a computer operated by a user, such as a mobile phone (including a smartphone), a portable information terminal (including a tablet computer), and a personal computer. As shown in FIG. 1, the user terminal 20 includes a control unit 21, a storage unit 22, a communication unit 23, an operation unit 24, a display unit 25, and a capturing unit 26. The hardware configuration of the control unit 21, the storage unit 22, and the communication unit 23 may be the same as the hardware configuration of the control unit 11, the storage unit 12, and the communication unit 13, and descriptions thereof are omitted here.

The operation unit 24 is an input device, and includes, for example, a pointing device such as a touch panel and a mouse, and a keyboard. The operation unit 24 transmits an operation of a user to the control unit 21. The display unit is, for example, a liquid crystal display unit or an organic EL display unit. The capturing unit 26 includes at least one camera, for example, a CMOS image sensor or a CCD image sensor. The capturing unit 26 captures a still image or video, and generates image data. In this embodiment, the capturing unit 26 is included in the user terminal 20, although the capturing unit 26 may be provided outside the user terminal 20.

The programs and data described as being stored in the storage units 12 and 22 may be provided by other computer through a network. The hardware configuration of the server and the user terminal 20 is not limited to the above examples, and can adopt various types of hardware. For example, the hardware may include a reader (e.g., optical disc drive, memory card slot) for reading a computer-readable information storage medium, and an input/output unit (e.g., USB port) for inputting/outputting data to/from external devices. For example, programs and data stored in an information storage medium may be provided through the reader or the input/output unit.

[1-2. Overview of Search System]

The search system 1 in this embodiment stores a learner to classify information that is input, and searches for information similar to input information among a plurality of items of information to be searched based on a classification result of the input information input in the learner.

The learner is an algorithm of machine learning. In other words, the learner is a type of a program that substitutes information, that is input, into a calculation formula to output a calculation result. In this embodiment, supervised learning is used as machine learning. The machine learning may adopt various methods, and convolutional neural network is described in this embodiment, although recurrent neural network may be used. The learner is used to classify information, and thus also described as a classifier.

The input information is information used as a query for search. The information to be searched is information that is to be searched for and provided with an index. The information to be searched is information that is already input in the learner, and described as information that has been classified. The input information and the information to be searched may be in any format, such as, image, video, article, document, text, sound, music, and web site.

In the search system 1, any similar information search may be performed. For example, similar image search, similar video search, similar article search, similar document search, similar text search, similar sound search, similar music search, or similar web site search may be performed. In this embodiment, similar image search will be taken as an example of similar information search. As such, in this embodiment, the description of "similar image search" may be replaced with "similar information search".

In the embodiment, the input information and the information to be searched are images, and thus, description of "input image" may be replaced with "input information", and "image to be searched" may be replaced with "information to be searched." A case will be described in which the input image and the image to be searched are photographs, although the input image and the image to be searched may be computer graphics generated by graphic software.

The learner may adopt various learners that can be used for similar image search. For example, R-CNN, Fast R-CNN, or Faster R-CNN for classifying objects included in images may be used, or Illustration 2 vec for generating a vector from a feature of an image may be used.

In the search system 1, one database does not collectively manage images to be searched, but a database is divided into classifications for each object captured in the images to be searched. That is, the search system 1 divides the database into each classification of an object to manage, and performs similar image search based on a database corresponding to a classification of an input image output from the learner, and thereby reducing the number of data items to be searched and speeding up the similar image search. In the following, the search system 1 will be described in details.

[1-3. Functions Implemented in Search System]

Figure 2:
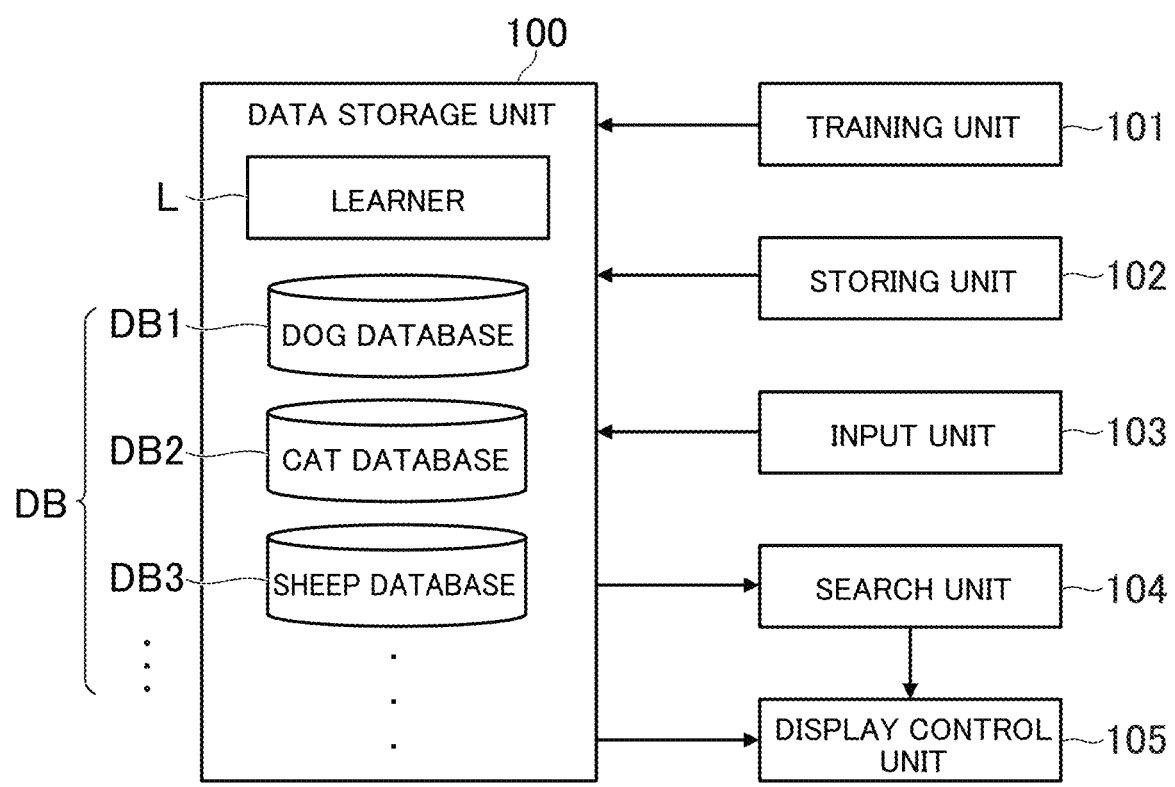
FIG. 2 is a functional block diagram showing an example of functions implemented in the search system.

FIG. 2 is a functional block diagram showing an example of functions implemented in the search system 1. As shown in FIG. 2, the search system 1 implements a data storage unit 100, a training unit 101, a storing unit 102, an input unit 103, a search unit 104, and a display control unit 105. In this embodiment, a case will be described in which the main functions relating to search are implemented in the server 10, although the functions may be shared between the server 10 and the user terminal 20 as in variations described later.

[1-3-1. Data Storage Unit]

The data storage unit 100 is implemented mainly by the storage unit 12. The data storage unit 100 stores data necessary for similar image search. Here, the data storage unit 100 stores a learner L and groups of databases.

[Learner]

The learner L calculates a feature quantity of information that is input, and outputs a classification result of the information based on the feature quantity. In this embodiment, information to be searched is an image to be searched, and input information is an input image. As such, the learner L calculates a feature quantity of an image that is input, and outputs a classification result of objects included in the image. Both of an input image and an image to be searched are input into the learner L, and thus, the input image described above means an input image and also means an image to be searched.

The feature quantity is information indicating a feature of an input image or an image to be searched, and calculated by, for example, a calculation formula included in the learner L. In this embodiment, the convolutional neural network is described as an example of the machine learning, and thus a feature quantity is calculated by an intermediate layer of the learner L.

The intermediate layer is a layer disposed between an input layer and an output layer, and also referred to as a hidden layer. The intermediate layer includes at least one calculation formula for calculating a feature quantity. For example, a coefficient of the calculation formula is determined by a training unit 101 described later. The number of the intermediate layer included in the learner L may be one, or two or more. If the learner L includes a plurality of intermediate layers, each of the intermediate layers calculates a feature quantity.

The feature quantity may be represented in any format, such as, a vector format, an arrangement format, a numeric format, and a character string format. In this embodiment, similar images are searched, and thus the feature quantity is information indicating a feature of an image, for example, at least one of a shape feature and a color feature of an object.

The shape feature is a feature of the object's contours and may indicate, for example, a feature of positional relationship between feature points, or a feature of contours detected by edge detection processing. The color feature is a feature of pixel values in an image, and obtained by, for example, substituting the pixel values into a predetermined calculation formula, or calculating distribution of the pixel values (histogram).

In this embodiment, a case will be described in which the learner L calculates a feature vector as a feature quantity. As such, in the embodiment, the description of "feature vector" may be replaced with "feature quantity." The feature vector is n-dimensional vector information (n is a natural number), and includes n number of numerical values. For example, the feature vector may indicate features analyzed in n number of views, and each of the n number of numerical values of the feature vector may indicate a feature of each of the n number of views. The learner L outputs a classification result based on the feature vector.

The classification is a type of an input image or an image to be searched. The classification may be described as attribute, category, genre, or section. The learner L may use classifications defined in taxonomy, or classifications uniquely defined in the search system 1 regardless of taxonomy.

In this embodiment, the similar image search is performed, and thus the learner L classifies objects captured in an input image or an image to be searched. The object may be any object included in an input image or an image to be searched, such as the foreground and the background. If the image is a photograph, a subject included in a capturing range of the capturing unit 26 corresponds to an object, and if the image is a computer graphic image, an illustration or a three-dimensional model created by graphic software corresponds to an object.

For example, the learner L outputs a probability of each classification as a classification result. The probability indicates likelihood, degree, or measure of belonging to a classification. When the probability is higher, the probability of belonging to the classification is higher, and when the probability is lower, the probability of belonging to the classification is lower.

In this embodiment, the probability is represented in numerical values greater than or equal to 0 and smaller than or equal to 1. For example, when a probability of a classification is p (p is numerical values greater than or equal to 0 and smaller than or equal to 1), the probability of belonging to the classification is "100*p" percent. The probability may be indicated in any range of values, for example, numerical values greater than 1 (e.g., range of values from dozens to tens of thousands), or symbols indicating the probability (e.g., symbols indicating ranks, such as S, A, B, in descending order of the probability).

For example, if the learner L has learned features of m types of classifications (m is a natural number), the learner L outputs probability of each of m types of classifications. In the following, a combination of m number of probabilities, which is output from the learner L as a classification result, is described as a score. As such, in this embodiment, the description of "score" can be replaced with "classification result".

In this embodiment, a case will be described in which an image is a photograph, and thus, the learner L has learned features of m types of objects, such as dog, cat, and sheep, and probabilities of capturing these m types of objects are output as a score. The objects learned in the learner L may be animate objects such as animals and plants, or inanimate objects such as vehicles and buildings.

Figure 3:
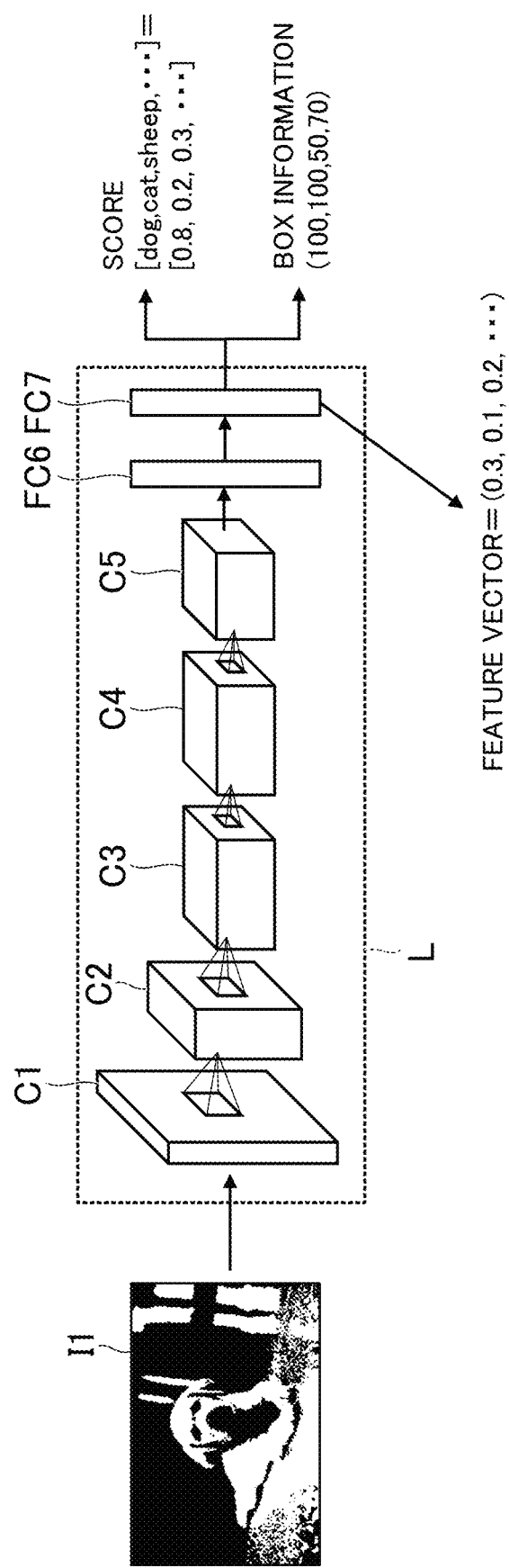
FIG. 3 is a diagram illustrating how a learner outputs scores of input images.
Figure 4:
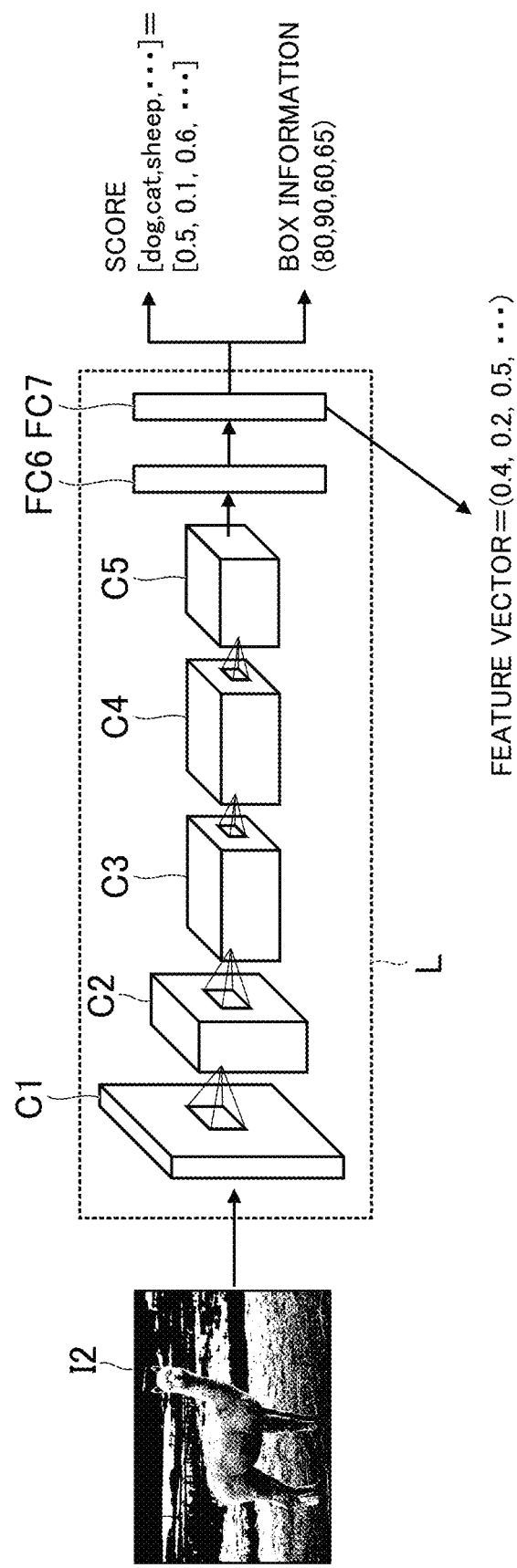
FIG. 4 is a diagram illustrating how the learner outputs scores of input images.

FIGS. 3 and 4 show how the learner L outputs a score of an input image. In FIGS. 3 and 4, the input layer and output layer of the learner L are omitted, and intermediate layers C1 to C5, FC6, and FC7 included in the learner L are shown. Here, the number of intermediate layers is seven, but may be freely determined, such as one to six, or eight or more.

For example, the intermediate layers C1 to C5 each include a convolution layer for extracting partial features of an image, and a pooling layer for summarizing the partial features. The convolution layer outputs a feature map indicating light and dark patterns of images, and the pooling layer generates a new feature map by reducing the output feature map. The feature map generated by the intermediate layers C1 to C5 may correspond to the feature quantity. Here, the number of combinations of the convolution layers and the pooling layers is five, although the number can be freely determined, such as one to four, or six or more.

Each of the intermediate layers FC6 and FC7 is a fully connected layer, and combines images, from which feature parts are taken out through the intermediate layers C1 to C5, to one node, and outputs values converted by an activation function as feature vectors. FIGS. 3 and 4 show the feature vector of the intermediate layer FC7, although the intermediate layer FC6 also outputs a feature vector. Here, the number of fully connected layers is two, although the number can be freely determined, such as one, or three or more.

The output layer (not shown) of the learner L calculates and outputs a score based on the feature vector output by the intermediate layer FC7. In the example of FIG. 3, an input image I1, in which a dog is captured, is input into the learner L. The learner L has already learned the dog, and thus, the score output from the learner L shows a high probability for the dog, and low probabilities for other classifications. As shown in FIG. 3, the score includes m number of probabilities. The probability of dog is "0.8" and high, and all the others have low probabilities.

In the example of FIG. 4, an input image I2, in which an alpaca is captured, is input into the learner L. Here, the alpaca is an object that is not learned in the learner L. In this regard, the alpaca has a similar appearance to the dog and the sheep (has intermediate features between the dog and the sheep), and thus, the scores output from the learner L indicate the probability of the dog as "0.5" and the probability of the sheep as "0.6." These probabilities are slightly higher than the others. All of the other probabilities are low.

The same applies to the other animals. For example, when an input image including an object learned in the learner L is input, a score in which a probability of such an object is high (e.g., 0.7 to 1), and probabilities of the other objects are low (e.g., less than 0.5) is output. For example, when an input image including an object, which is not learned in the learner L but similar to a plurality of learned objects (object having intermediate features between the learned objects), is input, a score in which probabilities of these objects are slightly high (e.g., 0.5 to 0.7) and probabilities of the other objects are low is output. When an input image including an object that is similar to none of the objects learned in the learner L is input, a score in which all of probabilities are low is output.

The learner L in this embodiment also outputs information other than scores, and can output a plurality of items of information. As shown in FIGS. 3 and 4, the learner L bifurcates after the intermediate layer FC7, and outputs two different items of information. In other words, a plurality of output layers are disposed in the learner L after the intermediate layer FC7. The learner L may only output scores instead of bifurcating the output layer.

The learner L may output any information other than scores, although in this embodiment, a case will be described in which position information relating to positions of objects is output. In embodiment 2, a case will be described in which other information is output. The learner L in this embodiment outputs a score of an object included in an image that is input and position information about the position of the object.

The position information is a position of an object in an image, and indicated by, for example, two-dimensional coordinates. In this embodiment, box information about a bounding box enclosing an object will be described as an example of the position information. As such, in the embodiment, the description of "box information" may be replaced with "position information".

The bounding box may have any shape, for example, a polygon such as a quadrangle, or a circle and an ellipse. In this embodiment, the bounding box is a bounding rectangle of an object, although the bounding box may be larger than or smaller than the bounding rectangle. The bounding box is an example of an area indicating an object. As such, in the embodiment, the description of "bounding box" may be replaced with "area indicating an object." Such an area may not have a shape referred to as a box, but may be, as described above, any shape such as a circle and an ellipse.

The box information may indicate only a position of a bounding box, although in this embodiment, also indicates a shape of a bounding box. For example, the box information includes two-dimensional coordinates indicating a position of a bounding box and a vertical width and a horizontal width of the bounding box. The two-dimensional coordinates may indicate any position of the bounding box, for example, positions at the center, upper left, upper right, lower left, or lower right. A shape of the bounding box may be specified by any information, for example, by a distance and an angle of a diagonal line.

In the example of FIG. 3, the box information indicates that the bounding box is at the position on the two-dimensional coordinates (100,100), the vertical width is "50" pixels, and the horizontal width is "70" pixels. In the example of FIG. 4, the box information indicates that the bounding box is at the position on the two-dimensional coordinates (80, 90), the vertical width is "60" pixels, and the horizontal width is "65" pixels.

As described above, the learner L in this embodiment calculates and outputs scores based on the feature vector output from the intermediate layer FC7 and the first calculation formula of the output layer. Further, the learner L calculates and outputs box information based on the feature vector output from the intermediate layer FC7 and the second calculation formula of the output layer. The first calculation formula and the second calculation formula are different from each other. The first calculation formula is specialized in calculating scores, and the second calculation formula is specialized in calculating box information. The training unit 101 described later adjusts coefficients of the first calculation formula and the second calculation formula.

For example, the learner L may calculate a feature vector from an entire input image and output a classification result of the entire input image, or calculate a feature vector of a bounding box included in an input image and output a classification result of the bounding box. When outputting the classification result of the bounding box, the learner L calculates the feature vector based on pixel values in the bounding box. That is, the learner L may not need to refer to pixel values other than the pixel values in the bounding box, and not need to output a classification result other than that of the bounding box.

Even if the number of objects included in an input image is one, sometimes a plurality of bounding boxes may be detected according to an object detection algorithm. For example, in the example of FIG. 3, many bounding boxes may be detected around the dog captured in the input image. The number of detected bounding boxes may be two, three, or dozens to hundreds, and these bounding boxes overlap with one another. "Overlap" means bounding boxes overlapping with one another. In other words, overlap means a part of a bounding box overlap a part of another bounding box, and a bounding box includes another bounding box. The classification results of all bounding boxes may be output, although, only one dog is captured in the bounding box, and thus, it is less necessary for the learner L to output a classification result for each of many bounding boxes.

As such, when a plurality of bounding boxes overlapping with one another are included in the input image, based on a feature vector of a bounding box having the highest probability of the classification result, the learner L may output the classification result of such a bounding box. The learner L calculates a score for each bounding box according to the method described above. The learner L removes the bounding boxes other than the bounding box having the highest probability included in the score. In other words, the learner L combines a plurality of bounding boxes overlapping with one another into the bounding box having the highest probability. The learner may output the classification result of the bounding box having the highest probability, and may not output the classification results of the other bounding boxes.

The number of objects included in an image may be one, although if a plurality of objects are included in an image that is input, the learner L may calculate a feature vector for each object and output a score. The learner L performs the processing described in FIGS. 3 and 4 on each of the objects so as to calculate feature vectors, and outputs a score and box information based on the feature vectors.

The algorithm for extracting an object from an image may use various object detection algorithms, such as an algorithm of Selective Search for Object Recognition (https://koen.me/research/pub/uijlings-ijcv2013-draft.pdf), and an algorithm implemented in Fast R-CNN or Faster R-CNN.

In this embodiment, the case has been described in which probability is output as a classification result, although a classification result may be any information about classification. For example, among the plurality of classifications, the learner L may output a classification to which an object belongs as a classification result. In this case, the learner L may output a numerical value indicating a classification to which the object belongs among the plurality of classifications, or, for each classification, output information of "0" or "1", which indicate whether an object belongs to a classification.

[Database Group]

The database group includes databases DB that store feature vectors of images to be searched for each classification. A classification and a database DB have a one-to-one relationship, and the databases DB are equal in number to the number of the classifications. In other words, in this embodiment, a plurality of classifications are not combined into one database DB, but the database DB is divided into respective classifications. In this embodiment, the learner L has learned m types of classifications, and thus the number of the databases DB is also m.

In this embodiment, the learner L has learned features of objects such as dog, cat, and sheep, and thus, as shown in FIG. 2, the database group includes databases DB for respective classifications, such as a dog database DB1, a cat database DB2, and a sheep database DB3. As such, a database for an object that is not learned in the learner L (e.g., alpaca database) does not exist. In this embodiment, when there is no particular need to distinguish among the databases, such as the dog database DB1, the cat database DB2, and the sheep database DB3, they are simply described as a database DB.

FIG. 5 is a diagram illustrating an example of data storage of the database DB. As shown in FIG. 5, the database DB stores file names, feature vectors, box information, and scores of images to be searched. Here, the databases DB have the same data structure, although the databases DB may have different data structures.

The file name is a name of image data (image file) of an image to be searched. The image data may be stored in the database DB, or in a database other than the database DB. The database DB may store a path name other than the file name so as to indicate where to find an image to be searched.

The feature vector is calculated by the intermediate layer FC7 when an image to be searched is input into the learner L. A feature vector calculated by the intermediate layer FC6 may also be stored. The box information is output when an image to be searched is input into the learner L. The score is output when an image to be searched is input into the learner L.

In this embodiment, a case will be described in which a feature vector is used for similar image search. That is, a case will be described in which an image to be searched similar to an input image in the feature vector is retrieved. As such, feature vectors stored in the database DB are indexes for search.

As described later, an image to be searched similar to an input image in the score may be retrieved. In this case, scores stored in the database DB are indexes for search. Further, as described below in embodiment 2, an image to be searched similar to an input image in the box information may be retrieved. In this case, box information stored in the database DB is index for search.

The database DB may store other information. For example, an image ID for uniquely identifying an image to be searched may be stored instead of a file name of the image to be searched. For example, information that cannot be an index for search may be omitted from the database DB.

The data stored in the data storage unit 100 is not limited to the above example. The data storage unit 100 may store data necessary for search, and may store, for example, a database in which image data of images to be searched is stored. For example, the data storage unit 100 may store training data used at the time of learning.

[1-3-2. Training Unit]

The training unit 101 is implemented mainly by the control unit 11. The training unit 101 trains the learner L to learn features of information belonging to each classification based on the teaching data. In this embodiment, a similar image is searched, and thus the training unit 101 trains the learner L to learn features of objects belonging to respective classifications based on the teaching data.

The teaching data is also referred to as training data, and indicates relationship between input and output. In this embodiment, input is an image, and output is scores and box information, and thus, the teaching data stores a lot of combinations of images and correct answers of scores and box information. The teaching data may be generated from a part or all of the images to be searched, or images other than the images to be searched.

The correct answer of a score is a score that correctly indicates a classification, and input manually, for example. In other words, the correct answer of a score is a score that the learner L desirably outputs (a score that the learner L should output). For example, in a case of an image in which a dog is captured, a score such as [1, 0, 0 . . . ] is a correct answer, and in a case of an image in which a cat is captured, a score such as [0, 1, 0 . . . ] is a correct answer. In a case of an image in which an alpaca that is not learned in the learner L is captured, a score such as [0.5, 0, 0.6 . . . ] may be a correct answer.

A correct answer of box information is information that correctly indicates a position and a shape of a bounding box, and input manually, for example. In other words, the correct answer of box information is information that the learner L desirably outputs (box information that the learner L should output).

The training unit 101 determines a calculation formula of each layer of the learner L so as to obtain relationship between input and output indicated by the teaching data. For example, each of the intermediate layers C1 to C5, FC6, and FC7 is learned by the relationship between the images and the correct answers of the scores and the box information. The output layer bifurcates after the intermediate layer FC7, and thus, the output layer of the scores is learned by the relationship between the images and the correct answers of the scores, and the output layer of the box is learned by the relationship between the images and the correct answers of the box information.

[1-3-3. Storing unit] The storing unit 102 is implemented mainly by the control unit 11. The storing unit 102 stores at least one of a feature vector and a score of an image to be searched input in the learner L in a database DB corresponding to a classification of the image to be searched among the databases DB prepared for respective classifications.

In this embodiment, the storing unit 102 stores both of feature vectors and scores in the database DB, although may store only either of the feature vectors and the scores. That is, the storing unit 102 may store only either of the feature vectors and the scores to be used as indexes for the similar image search in the database DB. As another example, the storing unit 102 may store other information, such as file names and box information, in the database DB.

"Learned in the learner L" means that something is previously input in the learner L. That is, an image to be searched has been input into the learner L at least one time, and the learner L has calculated a feature vector of the image to be searched and output a score and box information. The storing unit 102 obtains the feature vector and the score of the image to be searched output from the learner L.

The database DB corresponding to a classification means a database DB of a classification to which the image to be searched belongs. The images to be searched may be manually classified, or classified based on the scores output from the learner L. That is, the storing unit 102 may store a feature vector and a score of an image to be searched in a database DB of a classification specified by a human, or in a database DB determined by the score.

In this embodiment, the storing unit 102 stores a feature vector of and a score of information to be searched output from the learner L in a database DB corresponding to the score of the information to be searched. That is, for example, the storing unit 102 determines a database DB in which a feature vector of an image to be searched output from the learner L is stored based on a score of the image to be searched.

In this embodiment, a score indicates a probability of each classification. As such, the storing unit 102 stores a feature vector and a score of an image to be searched output from the learner L in a database DB of a classification having a probability of the classification of the image to be searched being a threshold value or more.

The threshold value may be any predetermined value, and is stored in the data storage unit 100. The threshold value may be common in all of the classifications, or different according to the classifications. The threshold value may have any value. In this regard, if an object that is not learned in the learner L is an image to be searched, as in a case of alpaca in FIG. 4, the threshold value preferably may not have a value that is higher than necessary. For example, the threshold value may be determined to be about 30% to 70% of the upper limit value (here, 1.0) of probabilities, and in this embodiment, 50% (here, 0.5) of the upper limit value.

The storing unit 102 compares the probabilities indicated by the scores of the classifications of the images to be searched with the threshold value, and specifies the classification having a probability equal to or more than the threshold value. If a plurality of classifications each have a probability equal to or more than the threshold value, the storing unit 102 specifies these classifications. The storing unit 102 stores a file name, a feature vector, box information, and a score of an image to be searched into a database DB of the specified classification. The file name may be provided so as not to duplicate a name of other image to be searched.

Figure 6:
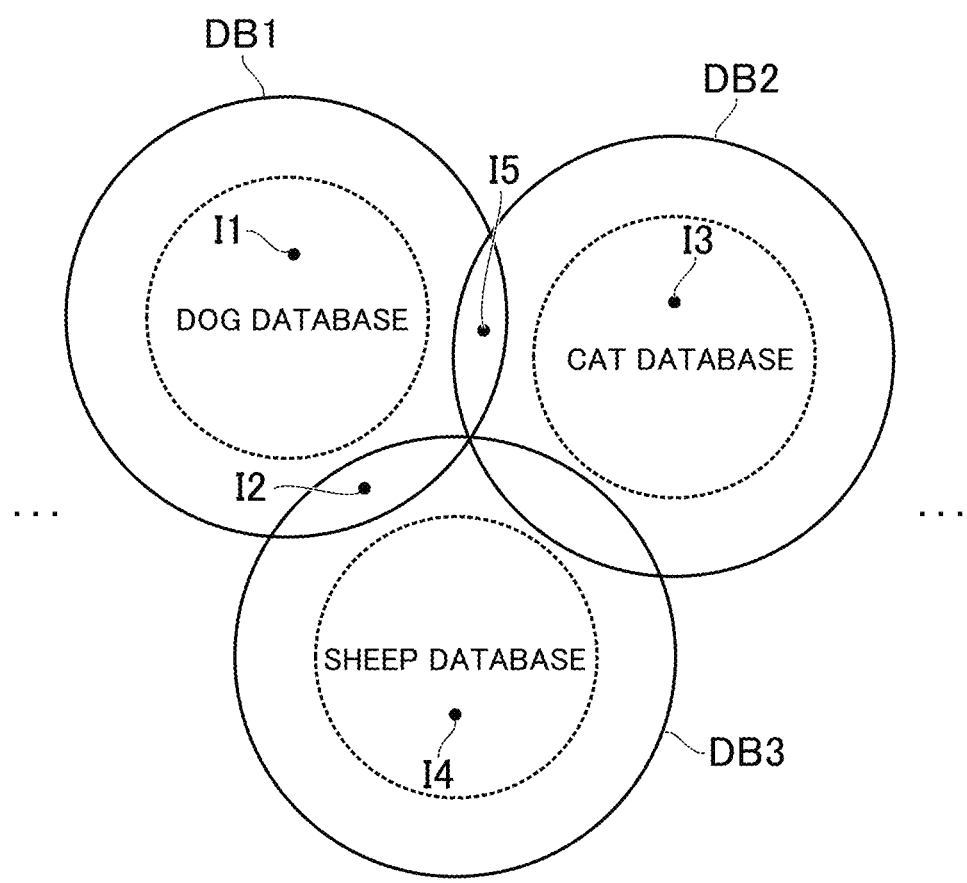
FIG. 6 is a diagram illustrating processing of a storing unit.

FIG. 6 is a diagram illustrating the processing of the storing unit 102. In FIG. 6, data stored in each database DB is indicated by a circle in a solid line. In this embodiment, information of image to be searched, such as a feature vector, is stored in a classification having a probability of 0.5 or more. As such, in FIG. 6, the circles in a solid line indicate images to be searched having the probability equal to or more than 0.5, and the circles in a dotted line indicate images to be searched having the probability equal to or more than 0.8.

For example, the image to be searched I1 (FIG. 3) in which a dog is captured has 0.8 probability of a dog, and less than 0.5 probability of others, and is thus stored only in the dog database DB1. For example, if the image to be searched I3 (FIG. 3) in which a cat is captured has 0.9 probability of a cat and less than 0.5 probability of others, the image to be searched I3 is stored only in the cat database DB2. For example, if the image to be searched I4 (FIG. 3) in which a sheep is captured has 0.8 probability of a sheep and less than 0.5 probability of others, the image to be searched I3 is stored only in the sheep database DB3.

As described, an image to be searched in which an object of a classification learned in the learner L is stored only in a database DB of such a classification. Regarding an image to be searched in which an object of a classification that is not learned in the learner L is captured, if the object has intermediate features between a plurality of classifications, the image to be searched is stored in each database DB of these classifications.

For example, an image to be searched in which an alpaca that is not learned in the learner L (e.g., input image I2 in FIG. 4) has 0.5 probability of a dog, 0.6 probability of a sheep, and less than 0.5 probability of others, and thus is stored in the dog database DB1 and the sheep database DB3. For example, a lion, which is not learned in the learner L, is similar to the dog and the cat in appearance (has intermediate features between the dog and the cat), and thus a probability of a dog and a probability of a cat are relatively high. For example, if the image to be searched I5 in which a lion is captured has 0.5 probability of a dog, 0.5 probability of a cat, and less than 0.5 probability of others, the image to be searched I5 is stored only in the dog database DB1 and the cat database DB2.

For example, the storing unit 102 may store feature vectors and scores of the entire image to be searched in the database DB, or store a feature vector and a score of a bounding box included in the image to be searched in the database DB. When storing the feature vector and the score of the bounding box in the database DB, the learner L stores the feature vectors and the scores that are obtained based on pixel values in the bounding box. That is, the storing unit 102 may store feature vectors and scores obtained without referring to pixel values outside the bounding box.

Similarly to the input image, even if the number of objects included in an image to be searched is one, sometimes a plurality of bounding boxes may be detected according to an object detection algorithm. The feature vectors and scores of all bounding boxes may be stored in the database DB. However, because only one object is captured in a bounding box, it is less necessary for the storing unit 102 to store feature vectors and scores of many respective bounding boxes.

As such, when a plurality of bounding boxes overlapping with one another are included in an image to be searched, the storing unit 102 may store at least one of a feature vector and a score of a bounding box having the highest probability of the classification result. A feature vector and a score are calculated for each bounding box based on the above described method. The bounding box having the highest probability included in the score is left, and the other bounding boxes are removed. In other words, the plurality of bounding boxes overlapping with one another are combined into the bounding box having the highest probability. The storing unit 102 may store the feature vector and the score of the bounding box having the highest probability in the database DB.

Instead of using the threshold value, the storing unit 102 may store a feature vector and a score of an image to be searched in a database DB of a classification having the highest probability indicated by the score of the image to be searched. For example, the storing unit 102 may specify the predetermined number of classifications in descending order of probabilities indicated by the score of the image to be searched, and store the feature vector and the score of the image to be searched in respective databases DB of these predetermined number of classifications.

For example, images to be searched may be manually classified, and the storing unit 102 may determine a database DB to store a file name, feature vector, box information, score of an image to be searched based on the classification determined by a human. If a classification (specified by a human as a correct answer) of an image to be searched is indicated in the teaching data to train the learner L, the storing unit 102 may store a file name, a feature vector, box information, and a score of the image to be searched based on the teaching data.

An image to be searched may be an image prepared in advance by the search system 1, or an image obtained by the search system 1 on the Internet. Alternatively, when the similar image search is performed, an input image may be a new image to be searched. In this case, the storing unit 102 may provide a file name to the input image at any time before the end of the similar image search, and store the input image, as a new image to be searched, together with a feature vector, box information, and a score obtained from the learner L into a database DB corresponding the score.

[1-3-4. Input Unit]

The input unit 103 is implemented mainly by the control unit 11. The input unit 103 inputs an input image in the learner L. The input image is sent from the user terminal 20 to the server 10, and thus, when the server 10 receives an input image from the user terminal 20, the input unit 103 inputs the input image in the learner L. In this embodiment, the convolutional neural network is described as an example of the learner L, and thus, the input unit 103 inputs the input image in the input layer of the learner L.

[1-3-5. Search Unit]

The search unit 104 is implemented mainly by the control unit 11. The search unit 104 searches for information to be searched having at least one of a feature vector and a score that are similar to the input information output from the learner L based on a database DB corresponding to the classification result of the input information among the databases DB prepared for respective classifications. In this embodiment, the similar image search is performed, and thus the search unit 104 searches for an image to be searched having at least one of a feature vector and a score that are similar to an input image.

In this embodiment, a case will be described in which the search unit 104 searches for an image to be searched similar to an input image in a feature vector, although the search unit 104 may search for an image to be searched similar to the input image both in a feature vector and a score, or an image to be searched similar to the input image only in a score. That is, both of a feature vector and a score may be an index of the similar image search, or either one of the feature vector and the score may be an index of the similar image search.

"Similar feature vectors" means that a difference between the feature vectors is small. Here, the difference may be a distance between vectors, or an angle between vectors. When a difference between feature vectors is smaller, an input image and an image to be searched are more similar to each other, and a difference between feature vectors is greater, an input image and an image to be searched are more unsimilar to each other. For example, when a distance is shorter, an input image and an image to be searched are more similar to each other, and when a distance is longer, an input image and an image to be searched are more unsimilar to each other. For example, when an angle is smaller, an input image and an image to be searched are more similar to each other, and when an angle is greater, an input image and an image to be searched are more unsimilar to each other.

"Similar scores" means that a difference between the scores is small. Here, the difference means a difference between numeric values. When a difference between scores is smaller, an input image and an image to be searched are more similar to each other, and a difference between scores is greater, an input image and an image to be searched are more unsimilar to each other. For example, when a difference between numeric values indicated by scores is smaller, an input image and an image to be searched are more similar to each other, and a difference between numeric values indicated by scores is greater, an input image and an image to be searched are more unsimilar to each other.

The database DB corresponding to a score of an input image is a database DB determined based on a score of an input image. In other words, database DB corresponding to a score of an input image is a database DB of a classification to which the input image belongs. The search unit 104 searches a database DB corresponding to a score of an input image, and does not search other databases DB. "To search" means to refer to data for the search, and to refer to an index (here, feature vector) in a database DB.

In this embodiment, a probability of each classification is included in a score, and thus, the search unit 104 performs the search based on a database DB of a classification having a probability of an input image output from the learner L being equal to or more than the threshold value.

The threshold value may be any predetermined value, and is stored in the data storage unit 100. The threshold value may be the same as or different from the threshold value described in the storing unit 102. The threshold value may be common in all of the classifications, or different according to the classifications. The threshold value may have any value, although, an object that is not learned in the learner L can be input into the learner L as in the case of alpaca in FIG. 4, and thus, the threshold value preferably may not have a value that is higher than necessary. For example, the threshold value may be determined to be about 30% to 70% of the upper limit value (here, 1.0) of probabilities, and in this embodiment, 50% (here, 0.5) of the upper limit value.

The search unit 104 compares the probabilities of the classifications indicated by the scores of the input images with the threshold value, and specifies a classification having a probability equal to or more than the threshold value. If a plurality of classifications each have a probability equal to or more than the threshold value, the storing unit 102 specifies these classifications. The search unit 104 specifies a database DB of the specified classification as a database DB corresponding to the score.

The search unit 104 may search all of the records in the database DB corresponding to the score, or may search only a part of the records. When only a part of the records are searched, the search unit 104 may select a record to be searched in a random way, or refer to the predetermined number of records in ascending order of record numbers. As another example, the search unit 104 may terminate the similar image search at the time when the predetermined number of images to be searched similar to the input image in the feature vector are found, and may stop searching other records. The searching method may adopt various known methods, such as the k-nearest neighbors algorithm (k is a natural number), which is a type of the nearest neighbor search problem.

For example, the search unit 104 performs the search based on a distance between the feature vector of the image to be searched, which is stored in the database DB corresponding to the score of the input image, and the feature vector of the input image. The method of calculating the distance may adopt various known methods, such as the Euclidean distance. For each image to be searched with a feature vector stored in a database DB corresponding to the score of the input image, the search unit 104 calculates a distance between a feature vector of an image to be searched and a feature vector of the input image.

For example, the search unit 104 obtains the predetermined number of images to be searched in ascending order of distances as images to be searched similar to the input image. The predetermined number may be any number, and, when the k-nearest neighbors algorithm is used, is a value of k. As another example, the search unit 104 may obtain an image to be searched having the shortest distance as an image to be searched similar to the input image, or obtain all of the images to be searched having the distance less than the threshold value as images to be searched similar to the input image.

If there are a plurality of databases DB corresponding to the score of the input image, the search unit 104 may search these databases DB for an image to be searched similar to the input image. In this embodiment, if there are a plurality of databases DB corresponding to the score of the input image, based on each of the databases DB, the search unit 104 searches for candidates of an image to be searched similar to the input image in at least one of a feature vector and a score, and narrows down the candidates. For example, for each database DB, the search unit 104 specifies an image to be searched similar to the input image as a candidate in the manner as described above. Subsequently, the search unit 104 narrows down the candidates.

For example, the search unit 104 may refer to distances of the candidates retrieved from the respective databases DB, and narrow down the candidates to the predetermined number of images to be searched in ascending order of distances as the images to be searched similar to the input image. The meaning of the predetermined number is the same as described above. For example, the search unit 104 may obtain the candidate having the shortest distance as an image to be searched similar to the input image. For example, the search unit 104 may obtain all of the candidates each having a distance less than the threshold value as images to be searched similar to the input image. However, the threshold value in this case is smaller than the threshold value for obtaining a candidate so as to make a condition stricter.

The input image and the images to be searched may each include one object. If the input image and the images to be searched each include a plurality of objects, the search unit 104 may search for an image to be searched similar to the input image in at least either of feature vectors and scores of some of the objects. That is, an image that is similar as an entire image may be searched, although in this embodiment, an image that is similar to the input image in some parts.

[1-3-6. Display Control Unit]

The display control unit 105 is implemented mainly by the control unit 11. The display control unit 105 displays box information of an image to be searched retrieved by the search unit 104 in association with the image to be searched. In this embodiment, the display control unit 105 is implemented mainly by the server 10, and thus, for example, the display control unit 105 sends image data of the image to be searched retrieved by the search unit 104 to the user terminal 20, thereby displaying the image to be searched on the display unit 25 of the user terminal 20.

To display box information is to distinguishably display a position indicated by the box information. In this embodiment, the box information indicates a position and a shape of a bounding box. As such, distinguishably displaying a position and a shape of a bounding box corresponds to displaying the box information. Further, the display control unit 105 is implemented by the server 10, and thus, for example, the display control unit 105 sends box information to the user terminal 20, thereby displaying the box information on the display unit 25 of the user terminal 20. To display box information in association with an image is to display box information together with an image.

For example, the display control unit 105 may display position information of a box image in association with an input image. In this embodiment, the display control unit 105 is implemented by the server 10, and thus, for example, the display control unit 105 sends box information to the user terminal 20, thereby displaying the box information on the display unit 25 of the user terminal 20.

Figure 7:
FIG. 7 is a diagram illustrating how a result of similar image search is displayed in a user terminal.

FIG. 7 is a diagram illustrating how a result of similar image search is displayed in the user terminal 20. As shown in FIG. 7, an image selection screen G1 for a user to select an input image is displayed on the display unit 25 of the user terminal 20. When the user selects an input image from the input form F10 and selects a button B11, the input image is uploaded to the server 10, and the similar image search is performed by the search unit 104.

Subsequently, the display control unit 105 sends the box information of the input image, the image data of the image to be searched, and the box information of the image to be searched to the user terminal 20. Upon receiving the data and information, the user terminal 20 displays a search result screen G2 for displaying the result of the similar image search on the display unit 25. A bounding box B22A is displayed on the input image selected by the user in a display area A20 of the search result screen G2, and bounding boxes B22B and B22C are displayed on each image to be searched a display area A21.

[1-4. Processing Executed in this Embodiment]

Figure 8:
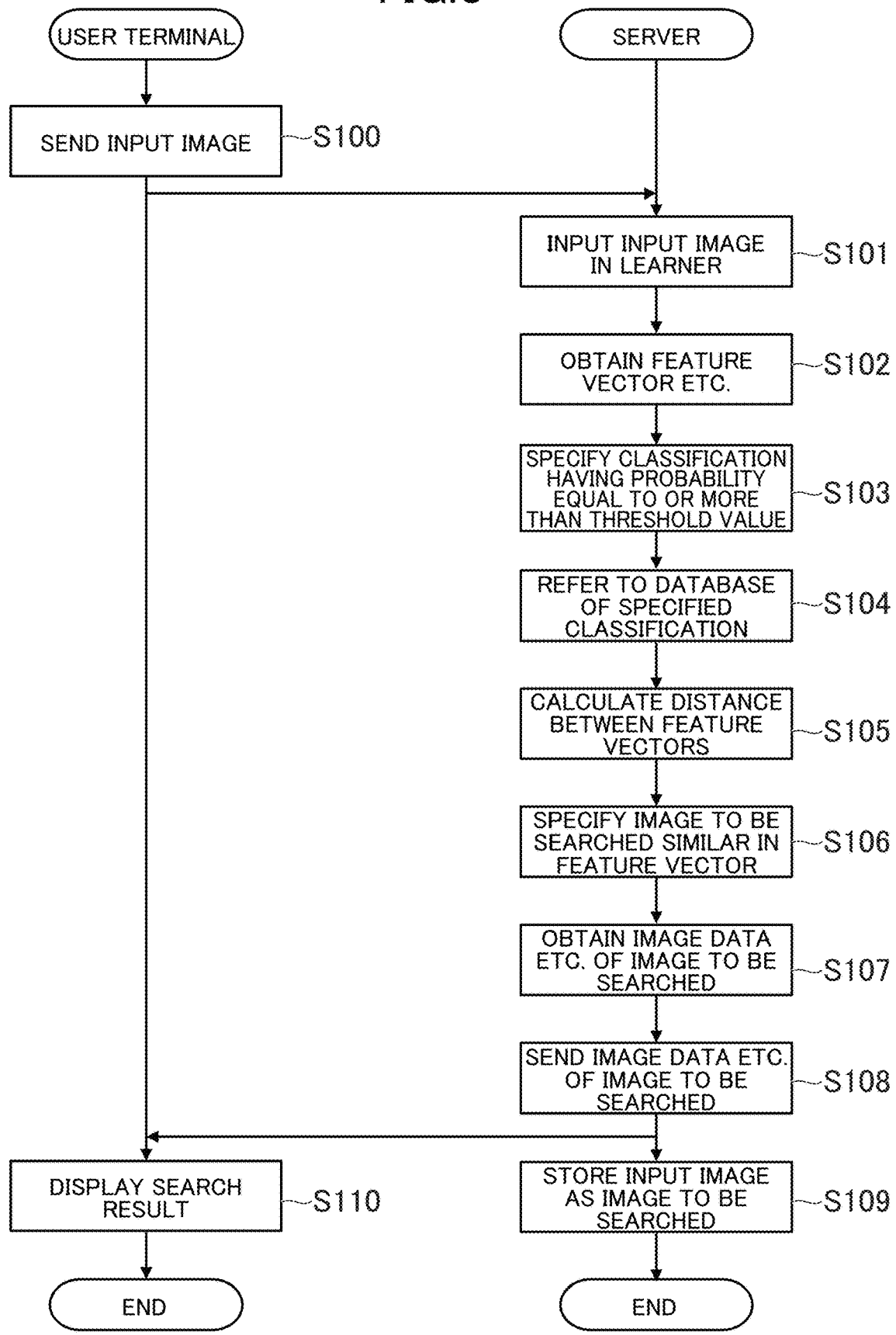
FIG. 8 is a flow chart showing an example of processing executed in the search system.

FIG. 8 is a flow chart showing an example of processing executed in the search system 1. The processing shown in FIG. 8 is executed when the control unit 11 operates in accordance with the program stored in the storage unit 12 and the control unit 21 operates in accordance with the program stored in the storage unit 22. The processing described below is an example of the processing executed by the functional block shown in FIG. 2.

As shown in FIG. 8, the control unit 21 of the user terminal 20 sends an input image selected on the image selection screen G1 to the server 10 (S100). In S100, the control unit 21 may send an image selected from images stored in the storage unit 22 or a cloud server (not shown), for example, as an input image, or send an image captured by the capturing unit 26 as an input image.

When the server 10 receives an input image, the control unit 11 sends the input image to the learner L (S101). When the input image is input in the learner L, the learner L calculates a feature vector of the input image, and outputs a score and box information based on the feature vector. If a plurality of bounding boxes are detected from the input image (i.e., a plurality of objects are captured in the input image), the learner L outputs a data set of a feature vector, box information, and a score for each bounding box.

The control unit 11 obtains the feature vector, the box information, and the score of the input image from the learner L (S102). In S102, the control unit 11 detects the bounding box from the input image, and obtains the feature vector based on pixels in the bounding box. Subsequently, the control unit 11 obtains box information indicating a position and a shape of the detected bounding box. Further, the control unit 11 obtains a score of the bounding box based on the feature vector of the bounding box.

If a plurality of bounding boxes overlap with one another, the control unit 11 may combine these bounding boxes to the bounding box having the highest score, and perform the processes in S103 to S106. The method of combining the bounding boxes may adopt various known methods, such as an algorithm of Non-Maximum Suppression. The control unit 11 performs the following processes S103 to S106 based on a score of a bounding box having the highest score among the plurality of bounding boxes. If a plurality of bounding boxes do not overlap with one another, the processes in S102 to S106 may be performed for each bounding box.

The control unit 11 specifies a classification having a probability indicated by the score of the input image being equal to or more than the threshold value (S103). If there is no classification having a probability equal to or more than the threshold value, the processes in S103 to S106 may not be performed, a message such as "there is no similar image" may be displayed on the user terminal 20.

The control unit 11 refers to the database DB of the classification specified in A103 among the database group stored in the storage unit 12 (S104). If a plurality of classifications are specified in S103, the control unit 11 refers to each databases DB of the classifications in S104.

The control unit 11 calculates a distance between the feature vector of the image to be searched stored in the database DB referred in S104 and the feature vector of the input image obtained in S102 (S105). If a plurality of classifications of databases DB are specified in S104, the control unit 11 calculates distances between the feature vectors of the images to be searched respectively stored in these databases DB and the feature vector of the input image in S105.

The control unit 11 specifies an image to be searched similar to the input image based on the distance calculated in S106 (S106). In S106, the control unit 11 specifies a predetermined number of images to be searched in ascending order of distance among the images to be searched having the feature vectors stored in the databases DB specified in S104 (i.e., images to be searched for which the distances are calculated in S105).

In S105, if distances between the feature vectors of the images to be searched respectively stored in the classifications and the feature vector of the input image are calculated, the control unit 11 specifies the predetermined number of images to be searched in ascending order of distance for each database DB in S106. Subsequently, the control unit 11 may narrow down the specified images to be searched to the predetermined number of images to be searched in ascending order of distance.

The control unit 11 obtains the image data and the box information of the image to be searched specified in S106 based on the database DB specified in S104 (S107). In S107, based on a file name referred to in a record of the image to be searched specified in S106, the control unit 11 obtains image data of the mage to be searched and the box information stored in the record.

The control unit 11 sends the box information of the input image obtained in S102 and the image data and the box information of the mage to be searched obtained in S107 to the user terminal 20 (S108).

The control unit 11 stores the feature vector, the box information, and the score of the input image, as the image to be searched, in the databases DB with the probability indicated by the score of the input image being equal to or more than the threshold value (S109). In S109, the control unit 11 adds the input image as a new image to be searched.

When the user terminal 20 receives the box information of the input image, for example, the control unit 21 displays the search result screen G2 on the display unit 25 (S110), then the processing terminates. In S110, the control unit 21 displays the input image and the bounding box B22A on the display area A20, and displays the image to be searched and the bounding boxes B22B and B22C on the display area A21.

According to the search system 1 as described above, the database DB is divided into each classification, and the search is performed based on a database DB corresponding to the score of the input image. This can reduce the data to be searched and speed up the search. For example, in a case where the database DB is divided into m pieces and there is one classification having a probability of the score being equal to or more than the threshold value, the amount of data to be searched can be reduced to "1/m" compared to a case where all of the images to be searched are managed by one database. This can speed up the similar image search by m times. Further, the processing load on the server 10 can also be reduced by reducing the amount of data to be searched.

The search is performed based on the distance between the feature vector of the image to be searched and the feature vector of the input image. By using a distance, which is an accurate index, accuracy of the search can be improved. Further, by using a distance, which can be readily calculated, it is possible to speed up the similar image search, and also reduce the processing load on the server 10.

For example, a feature vector of an image to be searched output from the learner L is stored in a database DB corresponding to a score of the image to be searched. This can save time and effort for specifying a database DB in which the image to be searched should be stored. Further, immediately after the similar search of an input image is performed, such an input image can be used as an image to be searched. This serves to increase the number of images to be searched. As a result, the probability of retrieving a more similar image to be searched can be increased, and thus accuracy of the search can be improved.

Further, a feature vector etc. of an image to be searched output from the learner L is stored in a database DB of a classification having a probability of the image to be searched being equal to or more than the threshold value. As such, the feature vector etc. of the image to be searched can be stored in a more suitable database DB, and thus it is possible to speed up the search and improve the accuracy of the search.

The search is performed based on the database DB of the classification having the probability of the input image output from the learner L being equal to or more than the threshold value. As such, it is possible to search a more suitable database DB, and this serves to speed up the search and also reduce the processing load on the server 10. Further, this serves to improve the accuracy of the search.

If a plurality of databases DB correspond to the score of the input image, candidates of an image to be searched similar to the input image are searched based on each of the databases DB and narrowed down. This can improve the accuracy of the search.

The similar image search can be speed up by applying the search system 1 to the similar image search.

If a plurality of bounding boxes overlapping with one another are included in an input image, the bounding boxes are combined into the bounding box having the highest probability indicated by a score, and the classification result is output based on the feature vector of the bounding box having the highest probability. This can improve the accuracy of the similar image search. In other words, it is possible to prevent a similar image from being searched based on a bounding box having relatively low probability indicated by a score. If a large number of bounding boxes are detected, it takes a lot of time to search a similar image for each bounding box. In this regard, by combining the bounding boxes, it is possible to speed up the similar image search, and effectively reduce the processing load on the server 20.

If a plurality of bounding boxes overlapping with one another are included in an image to be searched, a feature vector and a score of the bounding box having the highest probability of the score is stored in the database DB. This can improve the accuracy of the similar image search. In other words, it is possible to prevent a similar image from being searched based on a feature vector and a score of a bounding box having relatively low probability indicated by the score. If feature vectors and scores of a large number of bounding boxes are stored in the database DB, memory consumption of the database DB may be increased. In this regard, by combining the bounding boxes and then storing the feature vectors and the scores in the database DB, the memory consumption of the database DB can be reduced. Further, by reducing information that is referred to at the time of the similar image search, the similar image search can be speed up and the processing load on the server 20 can be effectively reduced.

A bounding box is displayed on the search result screen G2 in association with an image to be searched, and thus it is possible to readily recognize which object in the image to be searched is similar.

A bounding box is displayed on the search result screen G2 in association with an input image, and thus it is possible to readily recognize for which object the similar image search is performed.

Even if a plurality of objects are included in each of an input image and images to be searched, it is possible to search for an image that is similar to the input image in some of the included objects instead of an image in which entire objects are similar to the input image.

[1-5. Variations of Embodiment 1]

The invention according to the embodiment 1 is not to be limited to the above described embodiment. The invention according to the embodiment 1 can be changed as appropriate without departing from the spirit of the invention.

Figure 9:
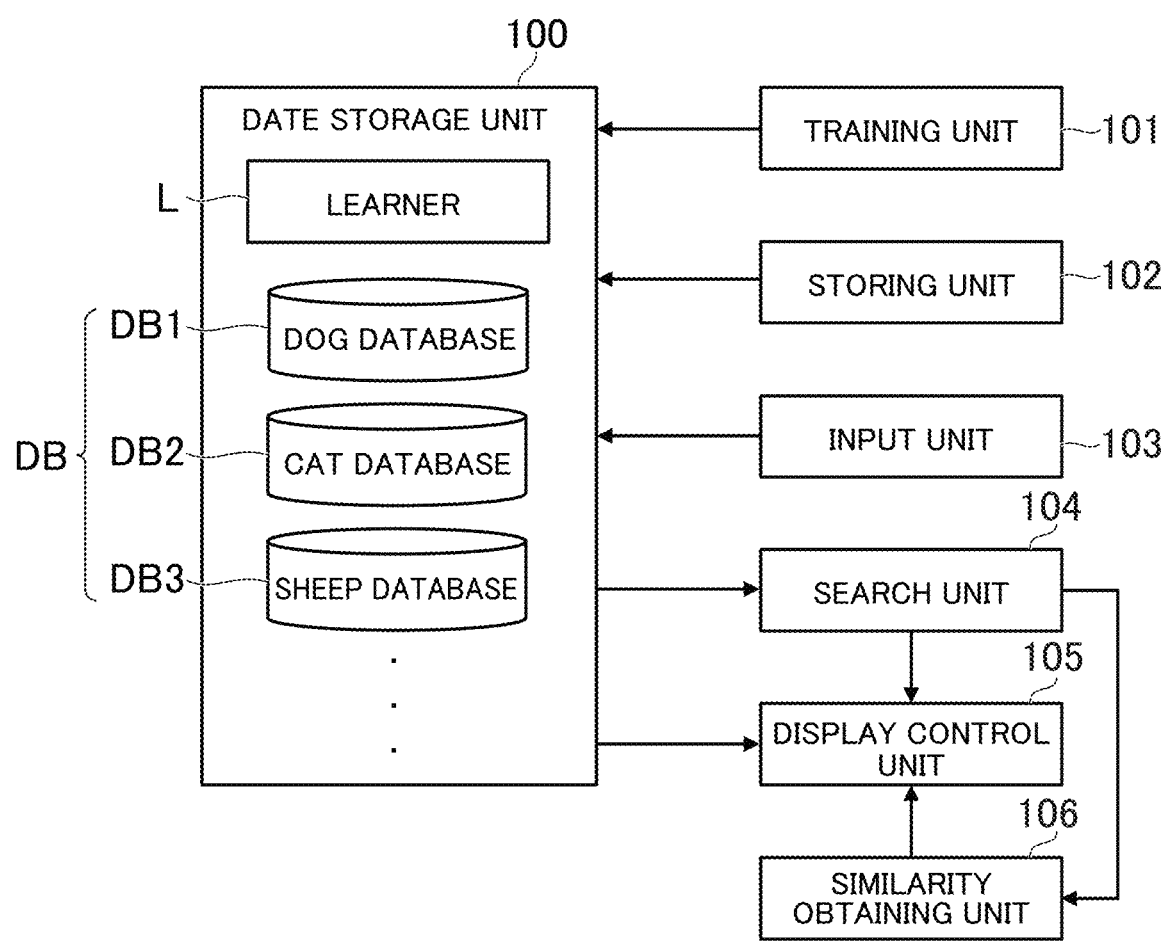
FIG. 9 is a functional block diagram of a variation of embodiment 1.

FIG. 9 is a functional block diagram of a variation of the embodiment 1. As shown in FIG. 9, in the variation of the embodiment 1, a similarity obtaining unit 106 is implemented in addition to the functions described in the embodiment 1. The similarity obtaining unit 106 is implemented mainly by the control unit 11.

The similarity obtaining unit 106 obtains similarity based on at least one of a feature vector and a score of an input image and at least one of a feature vector and a score of an image to be searched retrieved by the search unit 104. Here, a case will be described in which similarity is obtained based on a feature vector, although similarity may be obtained based on both of a feature vector and a score, or only on a score.

The similarity is a value indicating a degree of similarity. The higher similarity indicates being more similar, and the lower similarity indicates being less similar. For example, the similarity becomes higher when a difference between feature vectors is smaller, and the similarity becomes lower when a difference between feature vectors is greater. For example, the similarity becomes higher when a difference between scores is smaller, and the similarity becomes lower when a difference between scores is greater.

The calculation formula of similarity may be stored in the data storage unit 100 in advance, and the similarity obtaining unit 106 obtains similarity based on the feature vector of the input image, the feature vector of the image to be searched, and the calculation formula of similarity. For example, the similarity obtaining unit 106 may obtain the similarity by substituting a distance between these feature vectors into the calculation formula, or simply obtain the distance as the similarity.

The display control unit 105 displays the similarity in association with the image to be searched retrieved by the search unit 104. Here, the display control unit 105 is implemented by the server 10, and thus, for example, the display control unit 105 sends the similarity to the user terminal 20, thereby displaying the similarity on the display unit 25 of the user terminal 20. To display the similarity in association with the image to be searched is to display the similarity together with the image to be searched.

Figure 10:
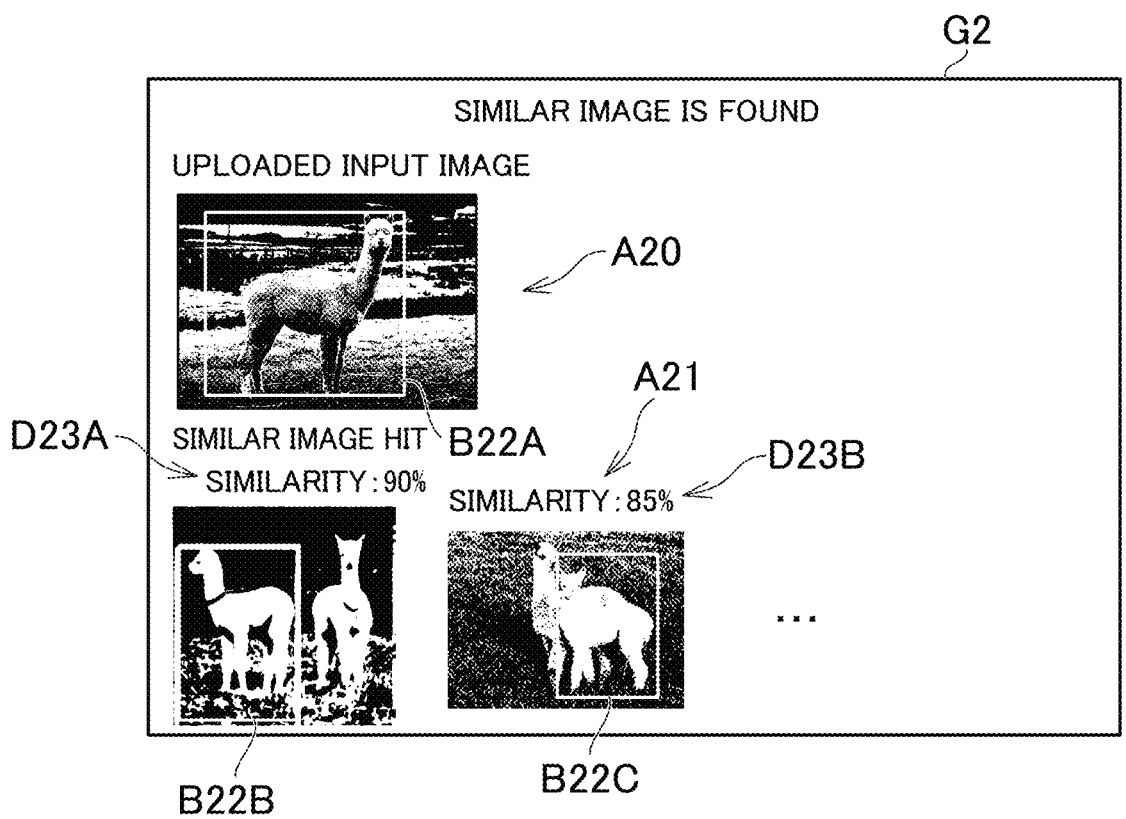
FIG. 10 is a diagram showing how a similarity is displayed.

FIG. 10 is a diagram showing how the similarity is displayed. As shown in FIG. 10, similarities D23A and D23B of respective images to be searched are displayed in the display area A21 of the search result screen G2. FIG. 10 shows the similarities D23A and D23B are displayed above the images to be searched, although the similarities D23A and D23B may be displayed in the images to be searched, or below, left, or right of the images to be searched.

According to the variation described above, the similarity between an input image and an image to be searched is displayed on the search result screen G2. This serves to readily recognize how the input image and the image to be searched are similar to each other.

For example, in the embodiment 1, the search system 1 is used for the similar image search, although the search system 1 may be used for any other similar information search.

For example, in a case where the search system 1 is used for similar video search, the learner L may calculate a feature vector of the video that is input, and output a classification result of the video. The classification of the video is a genre of the video, and may be, for example, comedy, action, and horror. In this case, the data storage unit 100 stores, for each classification of video, a database DB in which at least one of a feature vector and a score of a video to be searched is stored. The search unit 104 searches for a video to be searched that is similar to an input video output from the learner L in at least one of the feature vector and the score based on a database DB corresponding to the score of the input video.

For example, in a case where the search system 1 is used for similar article search, similar document search, or similar text search, the learner L may calculate a feature vector of a character string that is input, and output a classification result of the character string. The classification of the character string is a genre of content, and may be, for example, economics, sports, entertainment, thesis, and word-of-mouth information. In this case, the data storage unit 100 stores, for each classification, a database DB in which at least one of a feature vector and a score of an article to be searched, a document to be searched, or a text to be searched is stored. The search unit 104 searches for an article to be searched, a document to be searched, or a text to be searched that is similar to an input article, an input document, or an input text output from the learner L in at least one of the feature vector and the score based on a database DB corresponding to the score of the input article, the input document, or the input text.

For example, in a case where the search system 1 is used for similar sound search or similar music search, the learner L may calculate a feature vector of the sound or music that is input, and output a classification result of the sound or the music. The classification of the character string is a genre of sound or music, and may be, for example, rock, classic, pop, news, and an educational program. In this case, the data storage unit 100 stores, for each classification, a database DB in which at least one of a feature vector and a score of sound to be searched or music to be searched is stored. The search unit 104 searches for sound to be searched or music to be searched that is similar to input sound or input music output from the learner L in at least one of the feature vector and the score based on a database DB corresponding to the score of the input sound or the input music.

For example, in a case where the search system 1 is used for similar website search, a website to be searched that is similar to an input website may be searched using at least one of the similar image search, the similar video search, the similar article search, the similar document search, and the similar text search.

2. Embodiment 2

Next, another embodiment of the search system 1 will be described. In the embodiment 1, the box information is used for displaying a bounding box on the search result screen G2, although the box information may be used for the similar image search.

Figure 11:
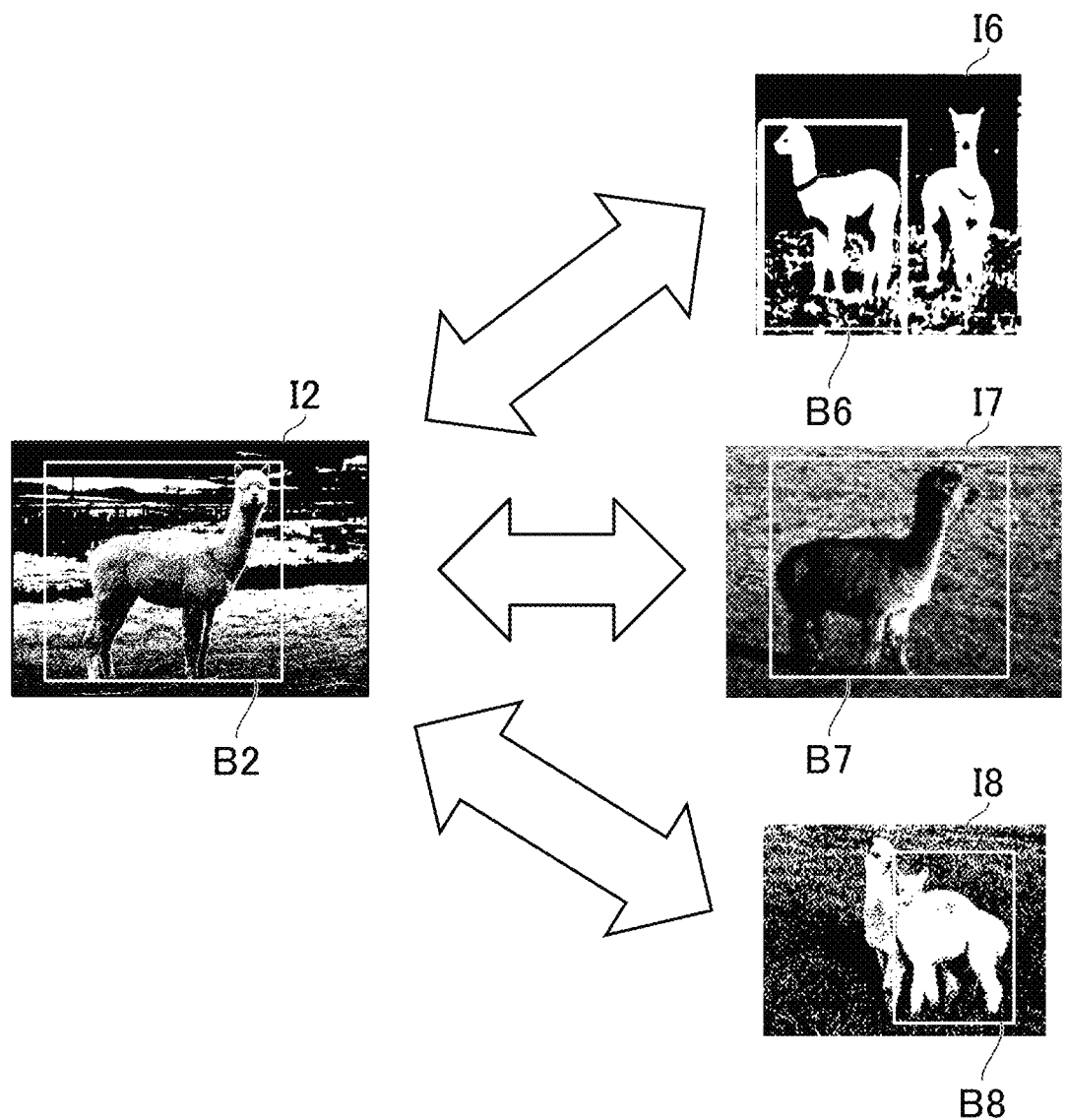
FIG. 11 is a schematic diagram explaining processing in embodiment 2.

FIG. 11 is a schematic diagram explaining processing in the embodiment 2. As shown in FIG. 11, by searching an image to be searched that is similar to an input image not only in a feature vector and a score but also in box information, an image to be searched that is similar to the input image in a position and a shape of the bounding box may be searched. In the example of FIG. 11, images to be searched 16 to 18 that are similar to the input image I2 in the feature vector are retrieved.

In the bounding boxes B6 to B8 of the respective images to be searched 16 to 18, the image to be searched 17 is most similar to the bounding box B2 of the input image I2 in the position and the shape. In this case, the image to be searched 17 is to be displayed on the search result screen G2. In this way, for example, in images of the same alpaca, it is possible to search for an image that is similar to the input image in a captured manner as well. In the example of FIG. 11, it is possible to search for an image that is similar to the input image in the orientation and the position of the alpaca in the image.

As described, the search system 1 in the embodiment 2 searches for an image to be searched that is similar in a plurality of views, thereby improving the accuracy of the search. In the following, the search system 1 in the embodiment 2 will be described in details. In the embodiment 2, descriptions similar to the embodiment 1 will be omitted.

[2-1. Functions Implemented in Search System]

A functional block of the embodiment 2 is the same as that of the embodiment 1. However, the details of the functions include parts different from the embodiment 1.

[2-1-1. Data Storage Unit]

The data storage unit 100 in the embodiment 2 may be the same as the data storage unit 100 described in the embodiment 1. For example, the data storage unit 100 stores a learner L and database groups. In the embodiment 2, a database DB may not be prepared for each classification (database DB is divided according to classifications), and one database DB may be prepared for a plurality of classifications. As such, in the embodiment 2, feature vectors etc. of a plurality of classifications of images to be searched may be stored in one database DB. In this case, the processing in which the search unit 104 refers to a database DB corresponding to a classification of an input image is omitted.

The learner L of the embodiment 2 may be the same as the learner L described in the embodiment 1. For example, the learner L calculates a feature quantity of information that is input, and based on the feature quantity, outputs a first analysis result of the information in a first viewpoint and a second analysis result of the information in a second viewpoint. In the embodiment 2, similarly to the embodiment 1, the similar image search is performed, and thus the learner L calculates a feature quantity of an image that is input, and outputs a first analysis result in which features of the image are analyzed in a first viewpoint and a second analysis result in which features of the image are analyzed in a second viewpoint.

The meaning of the feature quantity is the same as described in the embodiment 1, and, in the embodiment 2, the learner L also calculates a feature vector as a feature quantity.

The viewpoint means how to analyze information, and can be also described as a standpoint. The learner L includes an intermediate layer, a first output layer, and a second output layer. The intermediate layer is disposed before the layer branches into the first output layer and the second output layer, and calculates a feature vector. In other words, the intermediate layer calculates a feature vector before the first output layer and the second output layer each perform calculation, and sends the calculated feature vector to the first output layer and the second output layer.

The first output layer outputs a first analysis result based on the feature vector calculated by the intermediate layer before branching. The first output layer includes a first calculation formula. The feature vector is substituted into the first calculation formula, and the first analysis result is thereby calculated. The second output layer outputs a second analysis result based on the feature vector calculated by the intermediate layer before branching. For example, the second output layer includes a second calculation formula. The feature vector is substituted into the second calculation formula, and the second analysis result is thereby calculated. The first calculation formula is a calculation formula in which a learning result in the first viewpoint is reflected, and the second calculation formula is a calculation formula in which a learning result in the second viewpoint is reflected.

Similarly to the embodiment 1, the learner L may calculate a feature vector from the entire input image and output the first analysis result and the second analysis result, or calculate a feature vector of a bounding box included in the input image and output a first analysis result and a second analysis result of the bounding box. Further, the processing performed in the case where a plurality of bounding box overlap with one another may be the same as the embodiment 1. If a plurality of bounding boxes overlapping with one another are included in the input image, the learner L may output a first analysis result and a second analysis result of the area based on a feature vector of a bounding box having the highest probability of at least one of the first analysis result and the second analysis result.

In this embodiment, similarly to the embodiment 1, classification of information and extraction of positions of bounding boxes (positions of objects) will be described as examples of analysis, although the analysis is not limited to these examples, and various analyses may be adopted. For example, extracting a feature quantity of information may correspond to the analysis.

For example, the first analysis result may be a classification result of information that is input. In this embodiment, the similar image search is performed, and thus a case will be described in which the first analysis result is a score of an input image. As such, the description of "score" in the embodiment 2 can be replaced with "first analysis result".

Similarly to the embodiment 1, the learner L in the embodiment 2 outputs a probability of each classification as a classification result. The learner L may output information other than a probability as an analysis result, and this is the same as described in the embodiment 1.

For example, the second analysis result may be box information about a position of an object. As such, in the embodiment, the description of "box information" may be replaced with "second analysis result." Similarly to the embodiment 1, the learner L in the embodiment 2 outputs a score of an object included in an image that is input as a first analysis result, and outputs box information about a position of the object as a second analysis result.

In the embodiment 2, similarly to the embodiment 1, an input image and an image to be searched may each include one object, although may each include a plurality of objects. If a plurality of objects are included in an image that is input, the learner L may calculate a feature vector for each object and output a score and box information. This is the same as the embodiment 1.

[2-1-2. Training Unit]

The training unit 101 in the embodiment 2 may be the same as the training unit 101 described in the embodiment 1. For example, the teaching data defines relationship between information and correct answers of the first analysis result and the second analysis result, and the training unit 101 trains the learner L based on the teaching data. For example, the training unit 101 adjusts a coefficient of the first calculation formula of the first output layer so as to obtain the correct answer of the first analysis result indicated by the teaching data, and adjusts a coefficient of the second calculation formula of the second output layer so as to obtain the correct answer of the second analysis result indicated by the teaching data.

[2-1-3. Storing Unit]

The storing unit 102 in the embodiment 2 may be the same as the storing unit 102 described in the embodiment 1, and stores, in the database DB, a feature vector of an image to be searched that has been input in the learner L. As described above, in the embodiment 2, the database DB needs not be divided into the classifications, and thus, in this case, the processing for determining a database DB to store the feature vector is omitted.

For example, similarly to the embodiment 1, among the databases DB prepared for respective classifications, the storing unit 102 may store a feature vector of information to be searched in a database DB of a classification corresponding to the image to be searched. For example, similarly to the embodiment 1, the storing unit 102 may store an image to be searched output from the learner L in a database DB corresponding to a score of the image to be searched. For example, similarly to the embodiment 1, the storing unit 102 may store an image to be searched output from the learner L in a database DB of a classification having probability of the image to be searched equal to or more than the threshold value. Details of this processing are as described in the embodiment 1.

For example, similarly to the embodiment 1, if a plurality of bounding boxes overlapping with one another are included in an image to be searched, the storing unit 102 may store a feature quantity of a bounding box having the highest probability of at least one of a first analysis result and a second analysis result. A feature vector and a score are calculated for each bounding box based on the above described method. The bounding box having the highest probability included in the score is left, and the other bounding boxes are removed. In other words, the plurality of bounding boxes overlapping with one another are combined into the bounding box having the highest probability. The storing unit 102 may store may store a feature vector of the bounding box having the highest probability in the database DB.

[2-1-4. Input Unit]

The input unit 103 in the embodiment 2 may be the same as the data storage unit 100 described in the embodiment 1, and inputs an input image in the learner L.

[2-1-5. Search Unit]

The search unit 104 in the embodiment 2 searches for information to be searched that is similar to input information in the feature vector based on the database DB. In the embodiment 2, the similar image search is performed, and thus the search unit 104 searches for an image to be searched that is similar to the input image in the feature vector.

In the embodiment 1, the similar image search is performed based on at least one of a feature vector and a score, although in the embodiment 2, the similar image search may be performed based on a feature vector, and may or may not use other information. Even if the similar image search is performed using only a feature vector without using other information, the feature vector includes both a first viewpoint and a second viewpoint, and thus, an image to be searched that is similar in both of a score and box information is to be retrieved consequently.

For example, the search unit 104 may search for an image to be searched that is similar to an input image in the score, and, among the retrieved images to be searched, may search for an image to be searched that is similar to the input image in the feature vector. That is, a score may also be used as an index in addition to a feature vector. The meaning of the similar score is the same as described in the embodiment 1.

For example, the search unit 104 refers to the database DB so as to search for an image to be searched similar to the input image in the score based on a difference between the score of the image to be searched and the score of the input image. For example, the search unit 104 obtains the predetermined number of images to be searched in ascending order of differences of scores as search results. For example, the search unit 104 may obtain the images to be searched with differences of scores being less than the threshold value as search results.

For example, the search unit 104 may search for an image to be searched that is similar to the input image in the box information, and, among the retrieved images to be searched, may search for an image to be searched that is similar to the input image in the feature vector. That is, box information may also be used as an index in addition to a feature vector and a score.

"Similar box information" means that a difference between items of box information is small. Here, the difference means a difference between numeric values. When a difference between items of box information is smaller, an input image and an image to be searched are more similar to each other, and a difference between items of box information is greater, an input image and an image to be searched are more unsimilar to each other. For example, when a difference between numeric values indicated by items of box information is smaller, an input image and an image to be searched are more similar to each other, and a difference between numeric values indicated by items of box information is greater, an input image and an image to be searched are more unsimilar to each other.

In this embodiment, the learner L outputs scores and box information as analysis results. In a case where other items of information are output as analysis results, a smaller difference between the items of information means that the analysis results are more similar. The processing that is described as a score or box information in this embodiment may be replaced with an analysis result, and the search unit 104 searches for an image to be searched that is similar to the input image in the analysis result, and, among the retrieved images to be searched, may search for an image to be searched that is similar to the input image in the feature vector.

For example, the search unit 104 may search for an image to be searched that is similar to the input image in the feature vector based on the database DB corresponding to the score of the input image among the databases DB prepared for the respective classifications. Further, for example, the search unit 104 may perform the search based on a distance between the feature vector of the image to be searched stored in the database DB and the feature vector of the input image. These processes are the same as described in the embodiment 1.

For example, the search unit 104 may perform the search based on the database DB of the classification having the probability of the input image output from the learner L being equal to or more than the threshold value. For example, if a plurality of databases DB correspond to the classification result of the input image, candidates of an image to be searched similar to the input image may be searched based on each of the databases DB and narrowed down. The input image and the images to be searched may each include a plurality of objects, and the search unit 104 may search for an image to be searched that is similar to the input image in the feature vectors of some of the objects. These processes are also the same as described in the embodiment 1.

[2-1-6. Display Control Unit]

The display control unit 105 of the embodiment 2 may be the same as the display control unit 105 described in the embodiment 1. For example, the display control unit 105 may display box information of an image to be searched retrieved by the search unit 104 in association with the image to be searched. For example, the display control unit 105 may display position information of an input image in association with the input image. These processes are the same as described in the embodiment 1.

[2-2. Processing Executed in Embodiment 2]

Figure 12:
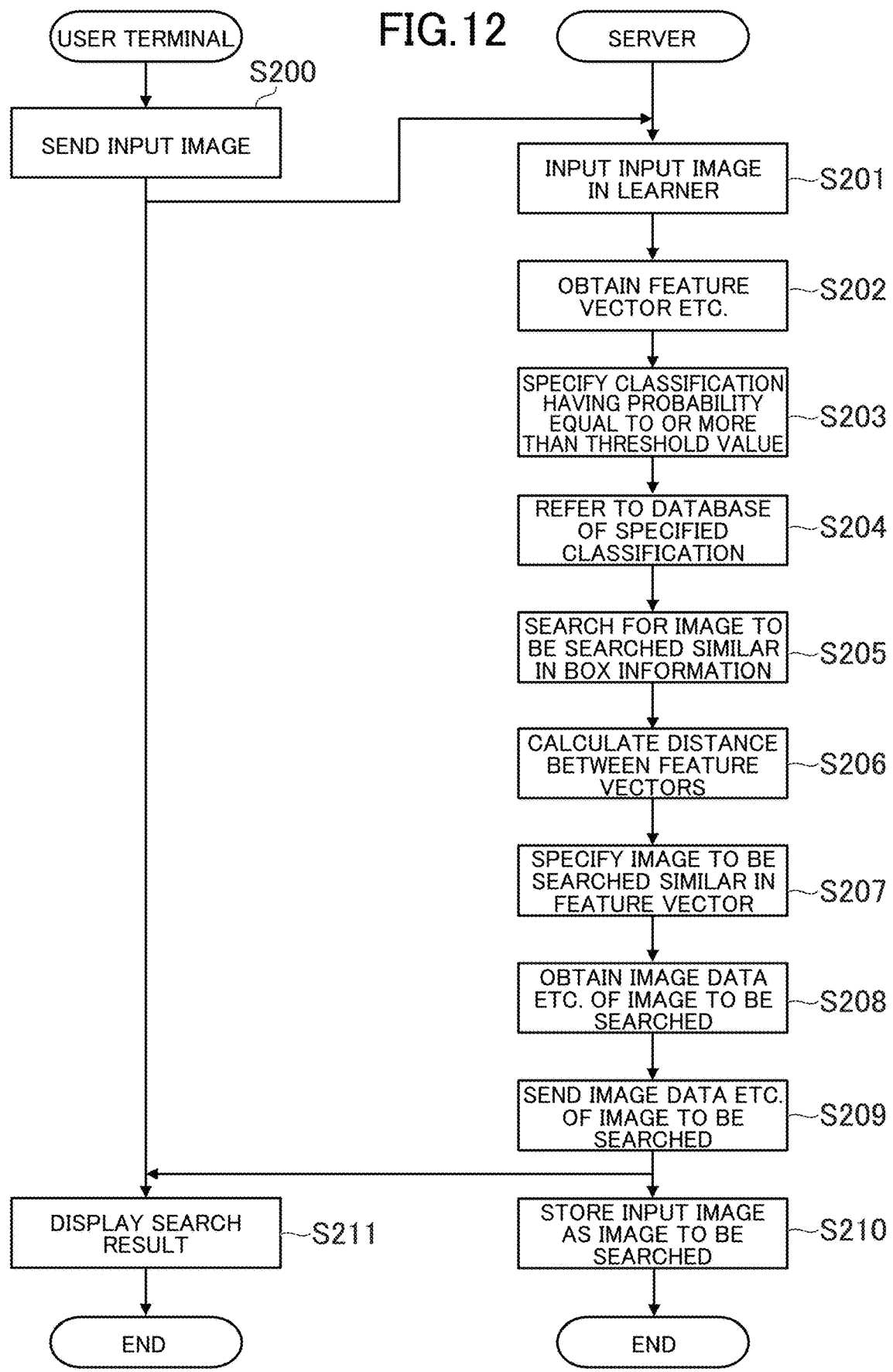
FIG. 12 is a flow chart showing an example of processing executed in the search system.

FIG. 12 is a flow chart showing an example of processing executed in the search system 1. The processing shown in FIG. 12 is executed when the control unit 11 operates in accordance with the program stored in the storage unit 12 and the control unit 21 operates in accordance with the program stored in the storage unit 22. The processing described below is an example of the processing executed by the functional block shown in FIG. 12.

As shown in FIGS. 12, S200 to S204 are respectively the same as S100 to S104. In S204, if a database DB having a probability equal to or more than the threshold value is referred to, the control unit 11 searches for an image to be searched that is similar to the input image in the box information (S205). In S205, the control unit 11 searches for a predetermined number of images to be searched in ascending order of differences between box information of the images to be searched and the box information of the input image.

In S205, the control unit 11 may obtain a difference (distance) between the two-dimensional coordinates indicated by the box information of the image to be searched and the two-dimensional coordinates indicated by the box information of the input image, or may obtain a difference (difference of width) between a shape (vertical width and horizontal width) indicated by the box information of the image to be searched and a shape (vertical width and horizontal width) indicated by the box information of the input image. The control unit 11 may obtain both of these differences.

The control unit 11 calculates a distance between the feature vector of the image to be searched retrieved in S205 and the feature vector of the input image (S206). In S206, the control unit 11 does not search all of the databases DB referred to in S204, but calculates distances of the images to be searched that are searched in S205. Other methods, such as the method of calculating a distance, are the same as the processing in S105.

In the following, S207 to S211 are respectively the same as S106 to S110. However, in S208, the control unit 11 obtains image data etc. of an image to be searched that is similar to the input image in all of feature vector, score, and box information, and in S211, the image to be searched that is similar to the input image in all of feature vector, score, and box information is displayed on the search result screen G2.

According to the search system 1 in the embodiment 2, the search is performed based on a feature vector including a feature that is not learned in the learner L, and thus, it is possible to search for information that is similar in a feature that is not learned in the learner L. This can improve the accuracy of the search. When performing the similar image search, a score and box information can be used, although even if only a feature vector is used, it is consequently possible to search for an image to be searched that is similar both in the score and the box information. In this case, it is not necessary to refer to a score and box information when the similar image search is performed, and this serves to speed up the similar image search.

Further, the search is performed based on the feature vector calculated by the intermediate layer that is disposed before the layer branches into the first output layer and the second output layer, and thus, it is possible to search for information that is similar in various viewpoints. This can improve the accuracy of the search.

Further, images to be searched that are similar to the input image in the classification are searched, and among the retrieved images, an image to be searched that is similar to the input image in the feature vector is searched. This can further improve the accuracy of the search.

Further, images to be searched that are similar to the input image in the classification are searched, and among the retrieved images, images to be searched that are similar to the input image in the box information are searched, and among the retrieved images, images to be searched that are similar to the input image in the feature vector are searched. This can further improve the accuracy of the search.

The database DB is divided for each classification, and the search is performed based on a database DB corresponding to the score of the input image. This can reduce the data to be search, and speed up the search. For example, in a case where the database DB is divided into m pieces and there is one classification having a probability of the score equal to or more than the threshold value, the amount of data to be searched can be reduced to "1/m" compared to a case where all of the images to be searched are managed by one database. This can speed up the similar image search by m times.

The search is performed based on the distance between the feature vector of the image to be searched and the feature vector of the input image. By using a distance, which is an accurate index, accuracy of the search can be improved. Further, by using a distance, which can be readily calculated, it is possible to speed up the similar image search.

For example, a feature vector of an image to be searched output from the learner L is stored in a database DB corresponding to a score of the image to be searched. This can save time and effort for specifying a database DB in which the image to be searched should be stored. Further, immediately after the similar search of an input image is performed, such an input image can be used as an image to be searched. This serves to increase the number of images to be searched. As a result, the probability of retrieving a more similar image to be searched can be increased, and thus accuracy of the search can be improved.

Further, a feature vector etc. of an image to be searched output from the learner L is stored in a database DB of a classification having a probability of the image to be searched being equal to or more than the threshold value. As such, the feature vector etc. of the image to be searched can be stored in a more suitable database DB, and thus it is possible to speed up the search and improve the accuracy of the search.

Further, the search is performed based on the database DB of the classification having the probability of the input image output from the learner L being equal to or more than the threshold value. As such, it is possible to search a more suitable database DB, and this serves to speed up the search and also improve the accuracy of the search.

If a plurality of databases DB correspond to the score of the input image, candidates of an image to be searched similar to the input image are searched based on each of the databases DB and narrowed down. This can improve the accuracy of the search.

The similar image search can be speed up by applying the search system 1 to the similar image search.

If a plurality of bounding boxes overlapping with one another are included in an input image, the bounding boxes are combined into the bounding box having the highest probability indicated by the score, and the first classification result and the second classification result are output based on the feature vector of the bounding box having the highest probability. This can improve the accuracy of the similar image search. In other words, it is possible to prevent a similar image from being searched based on a bounding box having relatively low probability indicated by the score. If a large number of bounding boxes are detected, it takes a lot of time to search for a similar image for each bounding box. In this regard, by combining the bounding boxes, it is possible to speed up the similar image search, and effectively reduce the processing load on the server 20.

If a plurality of bounding boxes overlapping with one another are included in an image to be searched, a feature vector of the bounding box having the highest probability of the score is stored in the database DB. This can improve the accuracy of the similar image search. In other words, it is possible to prevent a similar image from being searched based on a feature vector of a bounding box having relatively low probability indicated by a score. If feature vectors of a large number of bounding boxes are stored in the database DB, memory consumption of the database DB may be increased. In this regard, by combining the bounding boxes and then storing the feature vectors in the database DB, the memory consumption of the database DB can be reduced. Further, by reducing information that is referred to at the time of the similar image search, the similar image search can be speed up and the processing load on the server 20 can be effectively reduced.

A bounding box is displayed on the search result screen G2 in association with an image to be searched, and thus it is possible to readily recognize which object in the image to be searched is similar.

A bounding box is displayed on the search result screen G2 in association with an input image, and thus it is possible to readily recognize for which object the similar image search is performed.

Even if a plurality of objects are included in each of an input image and images to be searched, it is possible to search for an image that is similar to the input image in some of the included objects instead of an image in which entire objects are similar to the input image.

[2-3. Variations of Embodiment 2]

The invention according to the embodiment 2 is not to be limited to the above described embodiment. The invention according to the embodiment 2 can be changed as appropriate without departing from the spirit of the invention.

For example, in the variation of the embodiment 2, the functional block (FIG. 9) described in the variation of the embodiment 1 is implemented. In the variation of the embodiment 2 as well, the similarity obtaining unit 106 may obtain a similarity based on a feature vector of an input image and a feature vector of an image to be searched retrieved by the search unit 104, and the display control unit 105 may display the similarity in association with the image to be searched retrieved by the search unit 104. Details of this processing are the same as described in the variation of the embodiment 1.

According to the variation described above, the similarity between an input image and an image to be searched is displayed on the search result screen G2. This serves to readily recognize how the input image and the image to be searched are similar to each other.

Further, for example, in the embodiment 2, the case has been described in which the first analysis result is a score and the second analysis result is box information, although the learner L can output any analysis result, and may output other analysis result.

For example, the first viewpoint may be to classify information in a first classification group, and the second viewpoint may be to classify information in a second classification group. The first classification group and the second classification group may be classification groups that are different from each other, and, for example, the first classification group may indicate the classification of foreground, and the second classification group may indicate the classification of background. For example, the first classification group may be a classification of objects, and the second classification group may be a classification of background (scene). In this manner, for example, images that are similar in a plurality of viewpoints, such as "a dog on the beach" and "a man in the snow", can be searched.

In this case, the first analysis result is a first score in the first classification group, and the second analysis result is a second score in the second classification group. The feature vector calculated by the intermediate layer of the learner L also includes a feature of a viewpoint that is not learned in the learner L. As such, the search unit 104 searches for an image to be searched that is similar to the input image in the feature vector, the first score, and the second score, thereby searching for an image to be searched that is similar to the input image in other viewpoint that is not learned in the learner L.

For example, in the embodiment 2, the search system 1 is used for the similar image search, although the search system 1 may be used for any other similar information search.

For example, in a case where the search system 1 is used for similar video search, the learner L may calculate a feature vector of the video that is input, and output a first classification result and a second classification result of the video. For example, the first classification result may be a classification in a viewpoint such as a genre of a video, and the second classification result may be a classification in a viewpoint such as a length or revenues of a video. In this case, the search unit 104 searches for an image to be searched that is similar to the input video in the feature vector.

For example, in a case where the search system 1 is used for similar article search, similar document search, or similar text search, the learner L may calculate a feature vector of the character string that is input, and output a first classification result and a second classification result of the character string. The first classification result may be, for example, a rough genre of a text, and the second classification result may be, for example, a detailed genre. In this case, the search unit 104 searches for an article to be searched, a document to be searched, or a text to be searched that is similar to an input article, an input document, or an input text in the feature vector.

For example, in a case where the search system 1 is used for similar sound search or similar music search, the learner L may calculate a feature vector of the sound or music that is input, and output a first classification result and a second classification result of the sound or the music. The first classification result may be, for example, a rough genre of sound or music, and the second classification result may be, for example, a detailed genre of sound or music. In this case, the search unit 104 searches for sound to be searched or music to be searched that is similar to the input sound or the input music in the feature vector.

For example, in a case where the search system 1 is used for similar website search, a website to be searched that is similar to an input website may be searched using at least one of the similar image search, the similar video search, the similar article search, the similar document search, and the similar text search.

3. Other Variations

The present invention is not to be limited to the above described embodiments. The present invention can be changed as appropriate without departing from the spirit of the invention.

For example, in the embodiments 1 and 2, the main processing is performed in the server 10, although the processing described as being performed in the server 10 may be performed in the user terminal 20. For example, the learner L may be stored in the user terminal 20. In this case, the learner L is stored in a storage unit 22 of the user terminal 20. Further, the training unit 101 and the input unit 103 may be implemented by the user terminal 20. In this case, these functions are implemented mainly by the control unit 21. The training unit 101 of the user terminal 20 may train the learner L of the user terminal 20. The input unit 103 of the user terminal 20 inputs an input image in the learner L of the user terminal 20.

For example, the storing unit 102 may be implemented by the user terminal 20. In this case, the storing unit 102 is implemented mainly by the control unit 21. The storing unit 102 may send data such as a feature vector of an image to be searched to the server 10, and instruct the server 10 to store the data in the database DB. For example, the search unit 104 may be implemented by the user terminal 20. In this case, the search unit 104 is implemented mainly by the control unit 21. The search unit 104 may send data such as a score of an input image to the server 10 so as to indicate a search.

For example, the display control unit 105 may be implemented by the user terminal 20. In this case, the display control unit 105 is implemented mainly by the control unit 21. The display control unit 105 of the user terminal 20 may receive image data and box information of an image to be searched from the server 10, and display such data on the search result screen G2. For example, the functions may be shared between the server 10 and the user terminal 20.

The invention claimed is:

1. A search system comprising:
    a server comprising a learner that calculates a feature quantity of a first image that is input and outputs a score of the first image and box information of the first image based on the feature quantity, the score indicating probability that is output by the learner and the box information indicating a position of a bounding box in the first image; and
    at least one processor configured to:
        store a feature quantity of the first image to be searched, which has been input in the learner, in a database,
        input a second image in the learner; and
        search for the first image that is similar to the second image in the feature quantity based on the database;
    wherein
        the learner includes an intermediate layer, a first output layer, and a second output layer,
        the intermediate layer is disposed before the learner branches into the first output layer and the second output layer and calculates the feature quantity,
        the first output layer outputs the score based on the feature quantity calculated by the intermediate layer before branching, and
        the second output layer outputs the box information based on the feature quantity calculated by the intermediate layer before branching;
    wherein the at least one processor searches for the first image that is similar to the second image in the score, and, among a plurality of retrieved first images, searches for the first image that is similar to the second image in the feature quantity; and
    the at least one processor searches for the first image that is similar to the second image in the box information among the first image that is similar to the second image in the score, and, among the plurality of retrieved first images, searches for the first image that is similar to the second image in the feature quantity.

2. The search system according to claim 1, wherein the score is a classification result of the information that is input,
the at least one processor stores the feature quantity of the first image to be searched in a database corresponding to a classification of the first image to be searched, each database being prepared for a corresponding classification, and
the at least one processor searches for the first image to be searched that is similar to the second image in the feature quantity based on the database corresponding to the classification result of the second image among the databases prepared for respective classifications.

3. The search system according to claim 1, wherein the learner calculates a feature vector as the feature quantity, and
the at least one processor performs the search based on a distance between a feature vector of the first image to be searched stored in the database and a feature vector of the second image.

4. The search system according to claim 2, wherein the at least one processor stores the first image to be searched, which is output from the learner, in a database corresponding to a classification result of the information to be searched.

5. The search system according to claim 4, wherein the learner outputs a probability of each classification as the classification result, and
the at least one processor stores the first image be searched, which is output from the learner, in a database of a classification having a probability of the first image be searched, the probability being equal to or more than a threshold value.

6. The search system according to claim 2, wherein the learner outputs a probability of each classification as the classification result, and
the at least one processor performs search based on a database of a classification having a probability of the second image, which is output from the learner, the probability being equal to or more than a threshold value.

7. The search system according to claim 2, wherein in a case where there are a plurality of databases that correspond to the classification result of the second image, based on each of the plurality of databases, the at least one processor searches for candidates of the first image to be searched that is similar to the second image in the feature quantity, and narrows down the candidates.

8. The search system according to claim 1, at least one processor:
obtains a similarity based on the feature quantity of the second image and a feature quantity of the first image to be searched; and
displays the similarity in association with the information to be searched.

9. The search system according to claim 1, wherein the learner calculates a feature quantity of an image that is input and outputs a score in which a feature of the image is analyzed and a box information in which a feature of the image is analyzed,
the first image to be searched is an image to be searched, the second image is an input image, and
the at least one processor searches for an image to be searched that is similar to the input image in the feature quantity.

10. The search system according to claim 9, wherein the learner calculates a feature quantity of an area indicating an object included in the input image and outputs the score and the box information of the area, and
in a case where a plurality of areas overlapping with one another are included in the input image, based on a feature quantity of an area having a highest probability of at least one of the score or the box information, the learner outputs the score and the box information of the area.

11. The search system according to claim 9, wherein the at least one processor:
stores, in a database, the feature quantity of the area indicating the object included in the image to be searched, and
in a case where a plurality of areas overlapping with one another are included in the image to be searched, stores a feature quantity of an area having a highest probability of at least one of the score or the box information.

12. The search system according to claim 9, wherein the learner outputs a classification result of an object included in an image that is input as the score, and outputs position information about a position of the object as the box information, and
the at least one processor displays the position information of the image to be searched in association with the image to be searched.

13. The search system according to claim 9, wherein the learner outputs a classification result of an object included in an image that is input as the score, and outputs position information about a position of the object as the box information, and
the at least one processor displays the position information of the input image in association with the input image.

14. The search system according to claim 9, wherein in a case where an image that is input includes a plurality of objects, the learner calculates a feature quantity of each object and outputs the score and the box information,
the input image and the image to be searched each include a plurality of objects, and,
the at least one processor searches for an image to be searched that is similar to the input image in the feature quantity of some of objects of the image to be searched.

15. The search system according to claim 1, wherein the at least one processor performs the search based on a distance between a two-dimensional coordinates indicating a box information for the first image and a two-dimensional coordinates indicating a box information for the second image.

16. A search method comprising:
storing a feature quantity of a first image to be searched, which has been input in a learner, in a database, the learner calculating a feature quantity of the first image that is input and outputting a score of the first image based on the feature quantity, the score indicating probability that is output by the learner and the box information indicating a position if a bounding box in the first image;
inputting a second image in the learner; and
searching for the first image to be searched that is similar to the second image in the feature quantity based on the database;
wherein
the learner includes an intermediate layer, a first output layer, and a second output layer, the intermediate layer is disposed before the learner branches into the first output layer and the second output layer and calculates the feature quantity, the first output layer outputs the score based on the feature quantity calculated by the intermediate layer before branching, the second output layer outputs the box information based on the feature quantity calculated by the intermediate layer before branching;

searching for the first image that is similar to the second images in the score, and, among a plurality of retrieved first images, searching for the first image that is similar to the second image in the feature quantity; and searching for the first image that is similar to the second image in the box information among the first image that is similar to the second image in the score, and, among the plurality of retrieved first images, searching for the first image that is similar to the second image in the feature quantity.

17. A non-transitory computer-readable information storage medium for storing a program that causes a computer to:

store a feature quantity of first image to be searched, which has been input in a learner, in a database, the learner calculating a feature quantity of the first image that is input and outputting a score of the first and a box information of the first image and a box information of the first image based on the feature quantity, the score indicating probability that is output by the learner and the box information indicating a position of a bounding box in the first image;

input a second image in the learner; and search for the first image to be searched that is similar to the second image in the feature quantity based on the database; wherein the learner includes an intermediate layer, a first output layer, and a second output layer, the intermediate layer is disposed before the learner branches into the first output layer and the second output layer and calculates the feature quantity, the first output layer outputs the score based on the feature quantity calculated by the intermediate layer before branching, the second output layer outputs the box information based on the feature quantity calculated by the intermediate layer before branching;

search for the first image that is similar to the second image in the score, and, among a plurality of retrieved first images, search for the first image that is similar to the second image in the feature quantity; and search for the first image that is similar to the second image in the box information among the first image that is similar to the second image in the score, and, among the plurality of retrieved first images, search for the first image that is similar to the second image in the feature quantity.

* * * * *